US012386279B2

(12) United States Patent
Hashimoto et al.

(10) Patent No.: US 12,386,279 B2
(45) Date of Patent: Aug. 12, 2025

(54) TONER

(71) Applicant: CANON KABUSHIKI KAISHA, Tokyo (JP)

(72) Inventors: Takeshi Hashimoto, Ibaraki (JP); Hayato Ida, Ibaraki (JP); Kazuki Murata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 17/576,014

(22) Filed: Jan. 14, 2022

(65) Prior Publication Data

US 2022/0236653 A1 Jul. 28, 2022

(30) Foreign Application Priority Data

Jan. 20, 2021 (JP) ................................ 2021-006915
Dec. 14, 2021 (JP) ................................ 2021-202485

(51) Int. Cl.
*G03G 9/087* (2006.01)
*G03G 9/08* (2006.01)
*G03G 9/097* (2006.01)

(52) U.S. Cl.
CPC ......... *G03G 9/08728* (2013.01); *G03G 9/081* (2013.01); *G03G 9/0825* (2013.01); *G03G 9/08706* (2013.01); *G03G 9/09725* (2013.01)

(58) Field of Classification Search
CPC .. G03G 9/08728; G03G 9/081; G03G 9/0825; G03G 9/08706
See application file for complete search history.

(56) References Cited

U.S. PATENT DOCUMENTS 9,575,426 B2 * 2/2017 Shimano ............ G03G 9/09371

FOREIGN PATENT DOCUMENTS

JP 2014130243 A 7/2014
JP 2014142632 A 8/2014

OTHER PUBLICATIONS

Fedors, R.F., "A Method for Estimating Both the Solubility Parameters and Molar vols. of Liquids", Polymer Engineering and Science, Feb. 1974, pp. 147-154, vol. 14, No. 2.

* cited by examiner

*Primary Examiner* — Mark F. Huff
*Assistant Examiner* — Boone Alexander Evans
(74) *Attorney, Agent, or Firm* — Canon U.S.A., Inc. IP Division

(57) ABSTRACT

A toner that is excellent in low-temperature fixability at the time of high-speed printing, achieves both hot offset resistance and winding resistance, and has such satisfactory durability as not to be liable to cause an image failure even at the time of long-term endurance. The toner includes a toner particle containing a binder resin including a first resin and a second resin, wherein the first resin is a crystalline resin, wherein the second resin is an amorphous resin, wherein, the toner has a domain-matrix structure formed of: a matrix containing the first resin; and domains each containing the second resin, wherein, an endothermic quantity $\Delta H$ (J/g) derived from the first resin satisfies a relationship of $\Delta H \geq 3$, and wherein, in flow tester measurement of the toner, the following relationships are satisfied: $T10 \geq 65$; $T1-T10 \leq 10$.

7 Claims, No Drawings

TONER

BACKGROUND OF THE INVENTION

Field of the Invention

The present disclosure relates to a toner to be used in an electrophotographic system, an electrostatic recording system, an electrostatic printing system, or a toner jet system.

Description of the Related Art

In recent years, along with an increasingly widespread use of an electrophotographic full-color copying machine, there have been rising demands for an increase in speed of printing and energy saving measures. In order to adapt to high-speed printing, a technology for more quickly melting toner in a fixing process has been investigated. In addition, in order to improve productivity, technologies for shortening periods of time for various kinds of control during a job or between jobs have been investigated. In addition, in order to reduce power consumption in the fixing process as an energy saving measure, a technology for fixing toner at a lower temperature has been investigated.

It is known that, when a crystalline resin having a sharp melt property is used as a main component of a binder resin of a toner, the toner has excellent low-temperature fixability as compared to a toner using an amorphous resin as the main component. There are many proposals of toners each containing crystalline polyester as the resin having a sharp melt property. However, the crystalline polyester has been a material having a disadvantage in terms of charging stability in a high-temperature and high-humidity environment, in particular, maintenance of chargeability after standing in a high-temperature and high-humidity environment.

There are various proposals of toners each using a crystalline vinyl-based resin as another crystalline resin having a sharp melt property.

For example, in Japanese Patent Application Laid-Open No. 2014-130243, there is a proposal of a toner achieving both low-temperature fixability and heat-resistant storage stability through use of an acrylate-based resin having crystallinity in a side chain thereof. This toner can achieve both low-temperature fixability and heat-resistant storage stability, and is also improved to some extent in charging stability, which has been a weak point of the toner using the crystalline polyester resin. However, it has been revealed that the toner using the crystalline vinyl-based resin as the binder resin has so low a viscosity in a high-temperature region as to be liable to cause hot offset or winding, and hence has a narrow temperature region that allows fixation.

In view of the foregoing, in order to increase the viscosity of toner after its melting, addition of an amorphous resin to a crystalline resin has been investigated. For example, in Japanese Patent Application Laid-Open No. 2014-142632, there is a proposal of a toner using a binder resin using the crystalline vinyl-based resin and the amorphous resin in combination. This toner can secure a fixing region to some extent, but is required to be further improved. In addition, the toner has a disadvantage with low-temperature fixability at the time of high-speed printing, and a disadvantage with durability such as easy occurrence of an image failure, for example, an image streak, in long-term printing or the like, and hence is required to be improved.

SUMMARY OF THE INVENTION

The present disclosure provides a toner that is excellent in low-temperature fixability at the time of high-speed printing, achieves both hot offset resistance and winding resistance, and has such satisfactory durability as not to be liable to cause an image failure even at the time of long-term endurance.

The present disclosure relates to a toner including a toner particle containing a binder resin including a first resin and a second resin, wherein the first resin is a crystalline resin, wherein the second resin is an amorphous resin, wherein, in cross-sectional observation of the toner particle, the toner particle has a domain-matrix structure formed of: a matrix containing the first resin at 80% or more; and domains each containing the second resin at 80% or more, wherein, in differential scanning calorimetry (DSC) of the toner, an endothermic quantity $\Delta H$ (J/g) derived from the first resin satisfies a relationship of $\Delta H \geq 3$, and wherein, in flow tester measurement using the toner as a sample, T1 and T10 satisfy the following relationships: $T10 \geq 65$; $T1-T10 \leq 10$ where the T1 (° C.) represents a temperature at which a melt viscosity V1 at an applied pressure of 0.9807 MPa becomes $1\times10^5$ Pa·s, and the T10 (° C.) represents a temperature at which a melt viscosity V10 at an applied pressure of 9.807 MPa becomes $1\times10^5$ Pa·s.

Further features of the present disclosure will become apparent from the following description of exemplary embodiments.

DESCRIPTION OF THE EMBODIMENTS

In the present disclosure, the description "XX or more and YY or less" or "from XX to YY" representing a numerical range means a numerical range including a lower limit and an upper limit that are end points unless otherwise stated.

The term "(meth)acrylic acid ester" means an acrylic acid ester and/or a methacrylic acid ester.

When numerical ranges are described in stages, the upper limits and lower limits of the numerical ranges may be combined in any combination.

The term "monomer unit" refers to a form in which a monomer substance has reacted in a polymer. For example, in a polymer, one carbon-carbon bond in a main chain obtained by the polymerization of a vinyl-based monomer is one unit. The vinyl-based monomer may be represented by the following formula (Z).

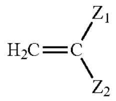

(Z)

In the formula (Z), $Z_1$ represents a hydrogen atom or an alkyl group (preferably an alkyl group having 1 to 3 carbon atoms, more preferably a methyl group), and $Z_2$ represents an arbitrary substituent.

The term "crystalline resin" refers to a resin that shows a clear endothermic peak in differential scanning calorimetry (DSC).

The present disclosure relates to a toner including a toner particle containing a binder resin including a first resin and a second resin, wherein the first resin is a crystalline resin, wherein the second resin is an amorphous resin, wherein, in cross-sectional observation of the toner particle, the toner particle has a domain-matrix structure formed of: a matrix containing the first resin at 80% or more; and domains each containing the second resin at 80% or more, wherein, in differential scanning calorimetry (DSC) of the toner, an endothermic quantity ΔH (J/g) derived from the first resin satisfies a relationship of ΔH≥3, and wherein, in flow tester measurement using the toner as a sample, T1 and T10 satisfy the following relationships: T10≥65; T1-T10≤10 where the T1 (° C.) represents a temperature at which a melt viscosity V1 at an applied pressure of 0.9807 MPa becomes $1\times10^5$ Pa·s, and the T10 (° C.) represents a temperature at which a melt viscosity V10 at an applied pressure of 9.807 MPa becomes $1\times10^5$ Pa·s.

The inventors of the present disclosure have found that, when a crystalline resin is used as a main component of a binder resin, even if an amorphous resin is added to impart viscoelasticity in a high-temperature region, a fixation temperature region is not necessarily widened. The inventors have found that both low-temperature fixability and hot offset resistance are reduced in some cases.

In addition, in a use situation in which a load is applied to a toner, such as long-term printing, its crystalline resin component is liable to migrate and stick onto a drum to cause an image failure. This phenomenon remarkably occurs with a toner having added thereto an amorphous resin. The inventors have made investigations for solving such disadvantage.

As a result, the inventors of the present disclosure have found that a toner using a crystalline resin as a main component of its binder resin and having added thereto an amorphous resin is improved in durability when the temperature-viscosity curve of the toner measured with a flow tester is hardly changed by an applied pressure. The inventors have further made extensive investigations based on the finding, and as a result, have reached the present disclosure.

The inventors of the present disclosure conceive that the mechanism via which the effect of the present disclosure is expressed is as described below.

In the domain-matrix structure of a toner particle cross-section, when the matrix contains the first resin, which is a crystalline resin, at 80% or more, and the domains each contain the second resin, which is an amorphous resin, at 80% or more, a sharp melt property based on the melting of a crystal is exhibited at the time of heating, to thereby exhibit excellent low-temperature fixability. When, conversely, the crystalline resin and the amorphous resin are present in the domains and the matrix, respectively, the melting characteristics of the toner as a whole are governed by the characteristics of the amorphous resin serving as the matrix. Accordingly, the effect on the low-temperature fixability based on the melting of the crystalline resin is not obtained, and hence the effect of the present disclosure is not obtained. Even in the case of using only one kind each of the crystalline resin and the amorphous resin, the above-mentioned ratios do not necessarily become 100% because of the presence of compatible components.

In general, a resin blended in a larger amount forms the matrix, and a resin blended in a smaller amount serves as the domains in many cases. However, the above-mentioned crystalline resin has a low viscosity after melting, and hence, when the production of the toner particle involves a step in which a temperature equal to or higher than the melting point of the crystalline resin is applied, the matrix is formed of the crystalline resin in some cases even if the blending mass ratio of the crystalline resin is small. Examples of such production step include a kneading step in a melt-kneading method and a fusing step in an emulsion aggregation method.

Meanwhile, from the viewpoints of the hot offset resistance and winding resistance, the viscosity of the molten toner is preferably high. The incorporation of the amorphous resin into the toner particle can increase the viscosity of the toner after melting.

However, as described above, when the amorphous resin is merely added, the fixation temperature region is not necessarily widened, and besides, under the condition that a stress is applied to the toner as in long-term printing or the like, the crystalline resin component in the toner migrates and fuses to the drum to cause an image failure in some cases.

A stress is applied to the toner owing to rubbing between a cleaning member and the drum during printing. It is conceived that, at this time, among the toner particles in a developing unit, there are toner particles to which an extremely large stress is applied. It is conceived that, when the toner has such characteristics that its temperature-viscosity characteristics significantly change depending on the magnitude of an externally applied pressure, even in the same temperature environment, the toner particles to which an extremely large stress is applied are reduced in viscosity to melt and stick on the drum, to thereby cause an image defect.

In contrast, it is conceived that, when the temperature-viscosity characteristics are about the same independent of the magnitude of the externally applied pressure, the above-mentioned phenomenon does not occur, and hence excellent durability can be exhibited.

The present disclosure has a feature in that, in differential scanning calorimetry (DSC) using the toner as a sample, an endothermic quantity ΔH (J/g) derived from the first resin satisfies a relationship of ΔH≥3. As described above, a reduction in viscosity caused by the melting of a crystal is required in order to exhibit excellent low-temperature fixability in the present disclosure. A ΔH of less than 3 (J/g) indicates that crystallinity is not sufficient, leading to a reduction in low-temperature fixability.

The upper limit is not particularly limited, but in view of the endothermic quantity of a general crystalline resin, may be 100 (J/g) or less in practice.

In addition, the present disclosure has a feature in that, in flow tester measurement using the toner as a sample, T1 and T10 satisfy the following relationships: T10≥65; T1-T1010 where the T1 (° C.) represents a temperature at which a melt viscosity V1 at an applied pressure of 0.9807 MPa becomes $1\times10^5$ Pa·s, and the T10 (° C.) represents a temperature at which a melt viscosity V10 at an applied pressure of 9.807 MPa becomes $1\times10^5$ Pa·s.

When the relationship of T10≥65 is satisfied, the toner particle can be prevented from fusing to any other member even if a large stress is applied thereto, and hence the occurrence of an image failure can be suppressed even in long-term printing. When T10 is less than 65, an image failure is liable to occur, resulting in a reduction in quality.

In addition, T1 is a viscosity characteristic at an applied pressure imitating a fixing process, and T1-T10≤10 indicates that the temperature-viscosity characteristics do not depend on the externally applied pressure very much. Accordingly, excellent low-temperature fixability and the suppression of the occurrence of an image failure at the time of long-term printing can both be achieved. When T1-T10 is more than 10, the low-temperature fixability is reduced, and the effect of the present disclosure on the low-temperature fixability is not obtained.

A method of causing T1-T10 to fall within the range of the present disclosure is not a simple choice, and the relationship of T1-T10≤10 can be achieved by controlling various physical property values of the first resin and the second resin. Investigations made by the inventors of the present disclosure have found that, when the SP values of the first resin and the second resin are close to each other, or when the softening point or weight-average molecular weight of the second resin is large as compared to the softening point or weight-average molecular weight of the first resin, T1-T10 tends to be easily controlled to fall within the range of the present disclosure.

The SP value is a numerical value indicating the polarity of a resin, and a higher SP value indicates higher polarity. A calculation method therefor is described later.

The SP value of the first resin, SP1, and the SP value of the second resin, SP2, preferably satisfy a relationship of $SP2-SP1 \leq 0.9$ because it becomes easy to cause T1-T10 to fall within the range of the present disclosure. A relationship of SP2-SP10.6 is more preferably satisfied.

With regard to a control method for the SP values, as described later, the SP values may be controlled by changing, for example, the kinds and content ratios of the constituent monomer units of the first resin and the second resin.

In DSC using the toner according to the present disclosure as a sample, the temperature Tp (° C.) at the maximum endothermic peak derived from the first resin preferably satisfies a relationship of $45 \leq Tp \leq 70$. In addition, the glass transition temperature Tg of the second resin and the temperature Tp at the maximum endothermic peak of the first resin preferably have a relationship of $Tg \leq Tp$. Further, the softening point Tm of the second resin and the temperature Tp at the maximum endothermic peak of the first resin preferably satisfy a relational expression of $Tp \leq Tm-30$ because it becomes easy to control T1-T10 to the range of the present disclosure.

Specifically, an example of the control method involves controlling the content, weight-average molecular weight Mw, softening point Tm, or temperature at the maximum endothermic peak of the first resin, which is a crystalline resin, the endothermic quantity ΔH derived from the crystalline resin serving as the first resin in the toner, or the like.

Another example of the control method involves controlling the content, weight-average molecular weight Mw, softening point Tm, glass transition temperature Tg, or the like of the amorphous resin serving as the second resin.

Still another example of the control method involves controlling the dispersion state of the domains in the domain-matrix structure of a toner particle cross-section. The number-average diameter of the domains preferably falls within the range of from 0.10 μm to 2.00 μm because it becomes easy to control T1-T10 to the range of the present disclosure. The number-average diameter is more preferably from 0.10 μm to 1.00 μm.

A control method for the number-average diameter of the domains involves, for example, controlling the polarity of each of the first resin and the second resin described above. In addition, the method involves, for example, controlling the number of screw rotations or a kneading temperature in the kneading step in the case of the melt-kneading method, or the dispersion diameter of a resin in a resin dispersion liquid in the case of the emulsion aggregation method at the time of the production of the toner.

The binder resin according to the present disclosure contains the first resin, and the first resin is a crystalline resin.

A known crystalline resin may be used as the crystalline resin. Examples thereof include crystalline polyester, a crystalline vinyl resin, crystalline polyurethane, and crystalline polyurea. In addition, the examples also include ethylene copolymers, such as an ethylene-vinyl acetate copolymer, an ethylene-methyl acrylate copolymer, an ethylene-ethyl acrylate copolymer, an ethylene-butyl acrylate copolymer, an ethylene-methyl methacrylate copolymer, an ethylene-methacrylic acid copolymer, and an ethylene-acrylic acid copolymer.

Of those, a crystalline polyester resin and a crystalline vinyl resin are preferred from the viewpoint of low-temperature fixability.

Further, the first resin is preferably a vinyl resin, and more preferably has a first monomer unit represented by the following formula (1). In addition, the content of the first monomer unit in the first resin is preferably from 20.0 mass % to 80.0 mass % because it becomes easy to achieve the low-temperature fixability as well as the hot offset resistance and the winding resistance.

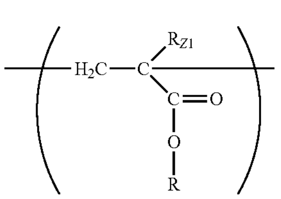

(1)

In the formula (1), $R_{Z1}$ represents a hydrogen atom or a methyl group, and R represents an alkyl group having 18 to 36 carbon atoms.

The R preferably represents an alkyl group having 18 to 30 carbon atoms. In addition, the alkyl group preferably has a linear structure.

The first monomer unit has the alkyl group having 18 to 36 carbon atoms represented by R in a side chain thereof, and the presence of this moiety allows the first resin to easily express crystallinity.

When the content of the first monomer unit in the first resin is from 20.0 mass % to 100.0 mass %, the first resin has crystallinity to contribute to an improvement in low-temperature fixability.

When the content of the first monomer unit in the first resin is less than 20.0 mass %, the crystallinity is hardly expressed, and hence the low-temperature fixability is liable to be reduced. The content is preferably 40.0 mass % or more, more preferably 50.0 mass % or more. The upper limit is not particularly limited, but when the first resin contains another monomer unit to be described later, the upper limit is preferably 90.0 mass % or less, more preferably 80.0 mass % or less.

In addition, such first resin is preferred because of being excellent in charging maintaining property in a high-temperature and high-humidity environment as compared to crystalline polyester, which is a conventionally well-known crystalline resin, presumably by virtue of having a structure having crystallinity in a side chain.

When the SP value $(J/cm^3)^{0.5}$ of the first monomer unit is represented by $SP_{11}$, $SP_{11}$ is preferably less than 20.00, more preferably 19.00 or less, still more preferably 18.40 or less. The lower limit value thereof is not particularly limited, but is preferably 17.00 or more.

The first monomer unit represented by the formula (1) is preferably a monomer unit derived from at least one (first polymerizable monomer) selected from the group consisting of (meth)acrylic acid esters each having an alkyl group having 18 to 36 carbon atoms.

Examples of the (meth)acrylic acid esters each having an alkyl group having 18 to 36 carbon atoms include (meth)

acrylic acid esters each having a linear alkyl group having 18 to 36 carbon atoms [e.g., stearyl (meth)acrylate, nonadecyl (meth)acrylate, eicosyl (meth)acrylate, heneicosanyl (meth) acrylate, behenyl (meth)acrylate, lignoceryl (meth)acrylate, ceryl (meth)acrylate, octacosyl (meth)acrylate, myricyl (meth)acrylate, and dotriacontyl (meth)acrylate] and (meth) acrylic acid esters each having a branched alkyl group having 18 to 36 carbon atoms [e.g., 2-decyltetradecyl (meth) acrylate].

Of those, at least one selected from the group consisting of (meth)acrylic acid esters each having a linear alkyl group having 18 to 36 carbon atoms is preferred from the viewpoint of the low-temperature fixability of the toner. At least one selected from the group consisting of (meth)acrylic acid esters each having a linear alkyl group having 18 to 30 carbon atoms is more preferred. At least one selected from the group consisting of linear stearyl (meth)acrylate and behenyl (meth)acrylate is still more preferred.

The first monomer units may be used alone or in combination thereof.

The first resin preferably has a second monomer unit that is different from the first monomer unit and is at least one selected from the group consisting of: a monomer unit represented by the following formula (3); and a monomer unit represented by the following formula (4).

In addition, when an SP value $(J/cm^3)^{0.5}$ of the second monomer unit is represented by $SP_{21}$, the $SP_{21}$ preferably satisfies the following expression (2), and more preferably satisfies the following expression (2)'.

$$21.00 \leq SP_{21} \tag{2}$$

$$21.00 \leq SP_{21} \leq 40.00 \tag{2)'}$$

(3)

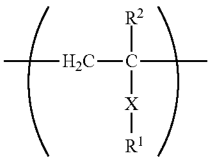

(4)

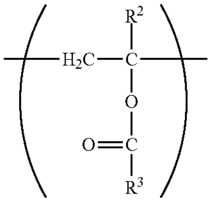

In the formula (3), X represents a single bond or an alkylene group having 1 to 6 carbon atoms, $R^1$ represents —C≡N, —C(=O)NHR$^{10}$ ($R^{10}$ represents a hydrogen atom or an alkyl group having 1 to 4 carbon atoms), a hydroxy group, —COOR$^{11}$ ($R^{11}$ represents a hydrogen atom, an alkyl group having 1 to 6 (preferably 1 to 4) carbon atoms, or a hydroxyalkyl group having 1 to 6 (preferably 1 to 4) carbon atoms), —NH—C(=O)—N($R^{13}$)$_2$ ($R^{13}$s each independently represent a hydrogen atom or an alkyl group having 1 to 6 (preferably 1 to 4) carbon atoms), —COO($CH_2$)$_2$NHCOOR$^{14}$ ($R^{14}$ represents an alkyl group having 1 to 4 carbon atoms), or —COO($CH_2$)$_2$—NH—C(=O)—N($R^{15}$)$_2$ ($R^{15}$s each independently represent a hydrogen atom or an alkyl group having 1 to 6 carbon atoms), and $R^2$ represents a hydrogen atom or a methyl group.

In the formula (4), $R^3$ represents an alkyl group having 1 to 4 carbon atoms, and $R^4$ represents a hydrogen atom or a methyl group.

A case in which the first resin contains the second monomer unit is preferred because polarization of charge based on having a highly polar functional group occurs to cause an effect of increasing the viscosity of the toner at the time of its melting to occur to facilitate the improvement of the winding resistance.

A second polymerizable monomer for forming the second monomer unit is exemplified by the following. In addition, the second polymerizable monomers may be used alone or in combination thereof.

A monomer having a nitrile group, for example, acrylonitrile or methacrylonitrile.

A monomer having a hydroxy group, for example, 2-hydroxyethyl (meth)acrylate or 2-hydroxypropyl (meth)acrylate.

A monomer having an amide group, for example, acrylamide, or a monomer obtained by causing an amine having 1 to 30 carbon atoms and a carboxylic acid having an ethylenically unsaturated bond and having 2 to 30 carbon atoms (e.g., acrylic acid or methacrylic acid) to react with each other by a known method.

A monomer having a urea group, for example, a monomer obtained by causing an amine having 3 to 22 carbon atoms [e.g., a primary amine (e.g., n-butylamine, t-butylamine, propylamine, orisopropylamine), a secondary amine (e.g., di-n-ethylamine, di-n-propylamine, or di-n-butylamine), aniline, or cyclohexylamine] and an isocyanate having an ethylenically unsaturated bond and having 2 to 30 carbon atoms to react with each other by a known method.

A monomer having a carboxy group, for example, methacrylic acid, acrylic acid, or 2-carboxyethyl (meth)acrylate.

Of those, a monomer having a nitrile group, an amide group, a urethane group, a hydroxy group, or a urea group is preferably used. A monomer having at least one kind of functional group selected from the group consisting of: a nitrile group; an amide group; a urethane group; a hydroxy group; and a urea group, and an ethylenically unsaturated bond is more preferred. When any such monomer is used, charge rising performance in a low-humidity environment is further improved. Of those, a nitrile group is particularly preferred because, by virtue of its high electron-withdrawing property, the above-mentioned polarization of charge can easily occur to cause an effect of increasing the viscosity of the toner at the time of its melting to occur to facilitate the improvement of the winding resistance.

As the second polymerizable monomer, at least one vinyl ester selected from the group consisting of: vinyl acetate; vinyl propionate; vinyl butyrate; vinyl caproate; vinyl caprylate; vinyl caprate; vinyl laurate; vinyl myristate; vinyl palmitate; vinyl stearate; vinyl pivalate; and vinyl octoate may be used.

The vinyl ester is an unconjugated monomer, and can easily maintain appropriate reactivity with the first polymerizable monomer. Accordingly, the crystallinity of the first resin can be easily improved, and hence both the low-temperature fixability and heat-resistant storage stability can be more easily achieved.

The second polymerizable monomer preferably has an ethylenically unsaturated bond, and more preferably has one ethylenically unsaturated bond.

The content of the second monomer unit in the first resin is preferably 0.1 mass % or more, more preferably 1.0 mass % or more, still more preferably 5.0 mass % or more. The upper limit thereof is preferably 70.0 mass % or less, more preferably 30.0 mass % or less, still more preferably 20.0 mass % or less.

In addition, it is appropriate to select, as the second monomer unit, a monomer unit that satisfies $SP_{21}$ represented by the expression (2).

In addition, the first resin may have a third monomer unit that is out of the ranges of the SP values of the first monomer unit and the second monomer unit to such an extent that the mass ratio between the above-mentioned first monomer unit and second monomer unit is not impaired.

It is appropriate to select, as a third polymerizable monomer for forming the third monomer unit, for example, a monomer that does not satisfy the expression (2) as a monomer unit among the monomers given in the foregoing section about the second polymerizable monomer. In the case of a monomer that satisfies the expression (2), the monomer may be used as the second polymerizable monomer.

In addition, the following monomers each free of the nitrile group, the amide group, the urethane group, the hydroxy group, the urea group, or the carboxy group may also be used.

For example, styrene and derivatives thereof, such as styrene and o-methylstyrene, and (meth)acrylic acid esters, such as methyl (meth)acrylate, n-butyl (meth)acrylate, t-butyl (meth)acrylate, and 2-ethylhexyl (meth)acrylate.

The third polymerizable monomer is preferably at least one selected from the group consisting of: styrene; methyl methacrylate; and methyl acrylate. The third polymerizable monomer is more preferably styrene from the viewpoint of the charging maintaining property.

The content of the third monomer unit derived from the third polymerizable monomer in the first resin is preferably 10.0 mass % or more, more preferably 15.0 mass % or more, still more preferably 20.0 mass % or more. The upper limit thereof is preferably 70.0 mass % or less, more preferably 50.0 mass % or less, still more preferably 40.0 mass % or less.

The first resin is preferably a vinyl polymer. An example of the vinyl polymer is a polymer of a monomer containing an ethylenically unsaturated bond. The "ethylenically unsaturated bond" refers to a radically polymerizable carbon-carbon double bond, and examples thereof include a vinyl group, a propenyl group, an acryloyl group, and a methacryloyl group.

The acid value AVa of the first resin, which is a crystalline resin, is preferably 50.0 mgKOH/g or less from the viewpoint of improving chargeability under high temperature and high humidity, and is more preferably 30.0 mgKOH/g or less. The lower limit is not particularly limited, but is preferably 0 mgKOH/g or more, and, from the viewpoint of improving the charge rising performance, is preferably 0.5 mgKOH/g or more, more preferably 1.0 mgKOH/g or more.

The hydroxyl value OHVa of the first resin, which is a crystalline resin, is preferably 50.0 mgKOH/g or less from the viewpoint of improving chargeability under high temperature and high humidity, and is more preferably 30.0 mgKOH/g or less. The lower limit is not particularly limited, but is preferably 0 mgKOH/g or more, and, from the viewpoint of improving the charge rising performance, is preferably 0.5 mgKOH/g or more, more preferably 1.0 mgKOH/g or more.

The weight-average molecular weight (Mw) of the tetrahydrofuran (THF)-soluble matter of the first resin, which is a crystalline resin, measured by gel permeation chromatography (GPC) is preferably 15,000 or more and 200,000 or less, more preferably 20,000 or more and 100,000 or less. A case in which the weight-average molecular weight (Mw) of the THF-soluble matter falls within the above-mentioned ranges is preferred because, in this case, elasticity around room temperature can be easily maintained, and hence an image failure at the time of long-term printing is less liable to occur.

In addition, the melting point of the first resin, which is a crystalline resin, is preferably 40° C. or more and 80° C. or less from the viewpoints of the heat-resistant storage stability and the low-temperature fixability, and is more preferably 45° C. or more and 70° C. or less.

The SP value of the first resin, $SP_1$, is preferably 18.0 or more, more preferably 18.6 or more, still more preferably 19.2 or more.

The content of the first resin, which is a crystalline resin, in the binder resin is preferably 20 mass % or more from the viewpoint of facilitating the obtainment of the domain-matrix structure, and is more preferably 30 mass % or more, still more preferably 40 mass % or more. The upper limit thereof is preferably 80 mass % or less, more preferably 70 mass % or less.

The binder resin according to the present disclosure contains the second resin, and the second resin is an amorphous resin.

A known amorphous resin may be used as the amorphous resin. Examples thereof include the following.

Polyvinyl chloride, a phenol resin, a natural resin-modified phenol resin, a natural resin-modified maleic acid resin, polyvinyl acetate, a silicone resin, a polyester resin, a polyurethane resin, a polyamide resin, a furan resin, an epoxy resin, a xylene resin, polyvinylbutyral, a terpene resin, a coumarone-indene resin, a petroleum-based resin, and a vinyl-based resin.

The case of using the crystalline polyester resin as the first resin is preferred because, when an amorphous polyester resin is used as the second resin, the first resin and the second resin have SP values close to each other to have a strong interaction to facilitate the control of T1-T10 to the range of the present disclosure.

Further, the case of using a resin containing the above-mentioned first monomer unit as the first resin is preferred because, when a vinyl-based resin is used as the second resin, the first resin and the second resin have SP values close to each other to have a strong interaction to facilitate the control of T1-T10 to the range of the present disclosure. In addition, this case is also preferred from the viewpoint of easily having the domain-matrix structure as compared to the case of using a polyester resin as the first resin.

The content of the second resin, which is an amorphous resin, in the binder resin is preferably 5 mass % or more, more preferably 10 mass % or more, still more preferably 20 mass % or more, particularly preferably 30 mass % or more. The upper limit thereof is preferably 70 mass % or less, more preferably 60 mass % or less, still more preferably 50 mass % or less.

In the toner particle of the present disclosure, the content W1 of the first resin and the content W2 of the second resin satisfy preferably a relationship of $0.2 \leq W2/W1 \leq 4.0$, more preferably a relationship of $0.3 \leq W2/W1 \leq 3.0$.

When a vinyl-based resin is used as the second resin, an example thereof is a polymer of a polymerizable monomer containing an ethylenically unsaturated bond. The "ethylenically unsaturated bond" refers to a radically polymerizable carbon-carbon double bond, and examples thereof include a vinyl group, a propenyl group, an acryloyl group, and a methacryloyl group.

Examples of the polymerizable monomer include the following.

Styrene-based monomers, such as styrene, o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, and p-nitrostyrene;

acrylic acid and acrylic acid esters, such as acrylic acid, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate, and phenyl acrylate;

α-methylene aliphatic monocarboxylic acids and esters thereof, such as methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; and acrylonitrile, methacrylonitrile, and acrylamide.

Further, the examples also include acrylic acid or methacrylic acid esters, such as 2-hydroxyethyl acrylate, 2-hydroxyethyl methacrylate, and 2-hydroxypropyl methacrylate, and polymerizable monomers each having a hydroxy group, such as 4-(1-hydroxy-1-methylbutyl)styrene and 4-(1-hydroxy-1-methylhexyl)styrene. Those monomers may be used alone or in combination thereof.

In addition to the monomers described above, various polymerizable monomers that may be subjected to vinyl polymerization may be used in combination in the vinyl-based resin as required.

Examples of the polymerizable monomer include the following.

Unsaturated monoolefins, such as ethylene, propylene, butylene, and isobutylene; unsaturated polyenes, such as butadiene and isoprene; vinyl halides, such as vinyl chloride, vinylidene chloride, vinyl bromide, and vinyl fluoride; vinyl esters, such as vinyl acetate, vinyl propionate, and vinyl benzoate; vinyl ethers, such as vinyl methyl ether, vinyl ethyl ether, and vinyl isobutyl ether; vinyl ketones, such as vinyl methyl ketone, vinyl hexyl ketone, and methyl isopropenyl ketone; N-vinyl compounds, such as N-vinylpyrrole, N-vinylcarbazole, N-vinylindole, and N-vinylpyrrolidone; vinylnaphthalenes; unsaturated dibasic acids, such as maleic acid, citraconic acid, itaconic acid, an alkenylsuccinic acid, fumaric acid, and mesaconic acid; unsaturated dibasic acid anhydrides, such as maleic anhydride, citraconic anhydride, itaconic anhydride, and an alkenylsuccinic anhydride; half esters of unsaturated basic acids, such as a methyl maleate half ester, an ethyl maleate half ester, a butyl maleate half ester, a methyl citraconate half ester, an ethyl citraconate half ester, a butyl citraconate half ester, a methyl itaconate half ester, a methyl alkenylsuccinate half ester, a methyl fumarate half ester, and a methyl mesaconate half ester; unsaturated basic acid esters, such as dimethyl maleate and dimethyl fumarate; acid anhydrides of α,β-unsaturated acids, such as acrylic acid, methacrylic acid, crotonic acid, and cinnamic acid; anhydrides of the α,β-unsaturated acids and lower fatty acids; and polymerizable monomers each having a carboxy group, such as an alkenylmalonic acid, an alkenylglutaric acid, and an alkenyladipic acid, acid anhydrides thereof, and monoesters thereof.

In addition, the vinyl-based resin may be a polymer crosslinked with such a crosslinking polymerizable monomer as exemplified below, as required.

Examples of the crosslinking polymerizable monomer include the following.

Aromatic divinyl compounds; diacrylate compounds each having acrylates bonded with an alkyl chain; diacrylate compounds each having acrylates bonded with an alkyl chain containing an ether bond; diacrylate compounds each having acrylates bonded with a chain containing an aromatic group and an ether bond; polyester-type diacrylates; and polyfunctional crosslinking agents.

Examples of the aromatic divinyl compound include divinylbenzene and divinylnaphthalene.

Examples of the diacrylate compound having acrylates bonded with an alkyl chain include ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and compounds obtained by changing the acrylates of the above-mentioned compounds to methacrylates.

The vinyl-based resin is preferably a polymer of a polymerizable monomer containing at least one selected from the group consisting of: styrene; o-methylstyrene; m-methylstyrene; p-methylstyrene; p-phenylstyrene; p-ethylstyrene; 2,4-dimethylstyrene; p-n-butylstyrene; p-tert-butylstyrene; p-n-hexylstyrene; p-n-octylstyrene; p-n-nonylstyrene; p-n-decylstyrene; p-n-dodecylstyrene; p-methoxystyrene; p-chlorostyrene; 3,4-dichlorostyrene; m-nitrostyrene; o-nitrostyrene; p-nitrostyrene; acrylic acid; methyl acrylate; ethyl acrylate; propyl acrylate; n-butyl acrylate; isobutyl acrylate; n-octyl acrylate; dodecyl acrylate; 2-ethylhexyl acrylate; stearyl acrylate; 2-chloroethyl acrylate; phenyl acrylate; methacrylic acid; methyl methacrylate; ethyl methacrylate; propyl methacrylate; n-butyl methacrylate; isobutyl methacrylate; n-octyl methacrylate; dodecyl methacrylate; 2-ethylhexyl methacrylate; stearyl methacrylate; phenyl methacrylate; dimethylaminoethyl methacrylate; diethylaminoethyl methacrylate; acrylonitrile; methacrylonitrile; acrylamide; 2-hydroxyethyl acrylate; 2-hydroxyethyl methacrylate; 2-hydroxypropyl methacrylate; 4-(1-hydroxy-1-methylbutyl)styrene; and 4-(1-hydroxy-1-methylhexyl)styrene.

In addition, the vinyl-based resin may be a copolymer of monomers including: at least one polymerizable monomer selected from the above-mentioned group; and at least one crosslinking polymerizable monomer selected from the group consisting of: divinylbenzene; divinylnaphthalene; ethylene glycol diacrylate; 1,3-butylene glycol diacrylate; 1,4-butanediol diacrylate; 1,5-pentanediol diacrylate; 1,6-hexanediol diacrylate; neopentyl glycol diacrylate; ethylene glycol dimethacrylate; 1,3-butylene glycol dimethacrylate; 1,4-butanediol dimethacrylate; 1,5-pentanediol dimethacrylate; 1,6-hexanediol dimethacrylate; and neopentyl glycol dimethacrylate. The content of the crosslinking polymerizable monomer in the monomers is preferably from about 0.5 mass % to about 5.0 mass % because a softening point to be described later can be easily controlled.

Of the above-mentioned polymerizable monomers, suitable examples may include a styrene-based monomer, an acrylic acid ester-based monomer, and a methacrylic acid ester-based monomer. A combination of styrene and n-butyl acrylate is preferred. In addition, the number-average diameter of the domains each containing the second resin, which is an amorphous resin, may also be controlled based on the number of carbon atoms of the alkyl group bonded to the ester moiety of the acrylic acid ester-based monomer or the methacrylic acid ester-based monomer.

The second resin, which is an amorphous resin, preferably has a monomer unit represented by the following formula (5). When the second resin has the monomer unit represented by the following formula (5), the content of the monomer unit of the following formula (5) in the second resin is preferably 30.0 mass % or more, more preferably 50.0 mass % or more, still more preferably 70.0 mass % or more. The upper limit thereof is preferably 95.0 mass % or less, more preferably 90.0 mass % or less.

(5)

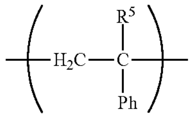

In the formula (5), $R^5$ represents a hydrogen atom or a methyl group, and Ph represents a phenyl group. The phenyl group may have a substituent.

The monomer unit represented by the formula (5) has a phenyl group, and hence particularly improves the charging maintaining property in a high-temperature and high-humidity environment.

In addition, when the first resin, as well as the second resin, has the monomer unit represented by the formula (5), an interaction resulting from 1 L electrons is likely to act between the phenyl groups contained in both the first resin and the second resin. As a result, the above-mentioned number-average diameter of the domains can be easily controlled to the above-mentioned numerical ranges. Further, the charging maintaining property in a high-temperature and high-humidity environment is also further improved.

The vinyl-based resin may be a resin produced using a polymerization initiator. It is appropriate that the polymerization initiator be used at 0.05 part by mass or more and 10 parts by mass or less with respect to 100 parts by mass of the polymerizable monomers from the viewpoint of efficiency.

Examples of the polymerization initiator include the following.

2,2'-Azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-carbamoylazoisobutyronitrile, 2,2'-azobis(2,4,4-trimethylpentane), 2-phenylazo-2,4-dimethyl-4-methoxyvaleronitrile, 2,2'-azobis(2-methylpropane), ketone peroxides, such as methyl ethyl ketone peroxide, acetylacetone peroxide, and cyclohexanone peroxide, 2,2-bis(tert-butylperoxy)butane, tert-butyl hydroperoxide, cumene hydroperoxide, 1,1,3,3-tetramethylbutyl hydroperoxide, di-tert-butyl peroxide, tert-butyl cumyl peroxide, dicumyl peroxide, α,α'-bis(tert-butylperoxyisopropyl)benzene, isobutyl peroxide, octanoyl peroxide, decanoyl peroxide, lauroyl peroxide, 3,5,5-trimethylhexanoyl peroxide, benzoyl peroxide, m-toluoyl peroxide, diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl) peroxycarbonate, acetylcyclohexylsulfonyl peroxide, tert-butyl peroxyacetate, tert-butyl peroxyisobutyrate, tert-butyl peroxyneodecanoate, tert-butyl peroxy-2-ethylhexanoate, tert-butyl peroxylaurate, tert-butyl peroxybenzoate, tert-butyl peroxyisopropylcarbonate, di-tert-butyl peroxyisophthalate, tert-butyl peroxyallylcarbonate, tert-amyl peroxy-2-ethylhexanoate, di-tert-butyl peroxyhexahydroterephthalate, and di-tert-butyl peroxyazelate.

A polyester resin that is generally used in a toner may be suitably used as the polyester resin. Examples of a monomer to be used in the polyester resin include polyhydric alcohols (dihydric or trihydric or higher alcohols) and polyvalent carboxylic acids (divalent or trivalent or higher carboxylic acids), acid anhydrides thereof, and lower alkyl esters thereof.

Examples of the polyhydric alcohol include the following.

Examples of the dihydric alcohol include the following bisphenol derivatives.

Polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane.

Examples of the other polyhydric alcohol include ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, and 1,3,5-trihydroxymethylbenzene.

Those polyhydric alcohols may be used alone or in combination thereof.

Examples of the polyvalent carboxylic acid include the following.

Examples of the divalent carboxylic acid include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of those acids, and lower alkyl esters thereof. Of those, maleic acid, fumaric acid, terephthalic acid, and n-dodecenylsuccinic acid are preferably used.

Examples of the trivalent or higher carboxylic acid, the acid anhydride thereof, or the lower alkyl ester thereof include the following.

1,2,4-Benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, EMPOL trimer acid, acid anhydrides thereof, and lower alkyl esters thereof.

Of those, 1,2,4-benzenetricarboxylic acid (trimellitic acid) or a derivative, such as an acid anhydride, thereof is preferably used because 1,2,4-benzenetricarboxylic acid (trimellitic acid) or the derivative thereof is available at low cost and its reaction can be easily controlled.

Those polyvalent carboxylic acids may be used alone or in combination thereof.

A production method for the polyester resin is not particularly limited, and a known method may be used. For example, the above-mentioned polyhydric alcohol and polyvalent carboxylic acid are simultaneously loaded, and are polymerized through an esterification reaction or a transesterification reaction, and a condensation reaction to produce the polyester resin. In addition, a polymerization temperature is not particularly limited, but preferably falls within the range of from 180° C. or more to 290° C. or less. In the polymerization of the polyester resin, a polymerization catalyst, such as a titanium-based catalyst, a tin-based catalyst, zinc acetate, antimony trioxide, or germanium dioxide, may be used.

The polyester resin to be used as the amorphous resin is preferably obtained by condensation polymerization using at least one of the titanium-based catalyst or the tin-based catalyst.

The acid value AVi of the second resin, which is an amorphous resin, is preferably 50.0 mgKOH/g or less from the viewpoint of improving chargeability under high temperature and high humidity, and is more preferably 30.0 mgKOH/g or less. The lower limit is not particularly limited, but is preferably 0 mgKOH/g or more, and, from the viewpoint of improving the charge rising performance, is preferably 0.5 mgKOH/g or more, more preferably 1.0 mgKOH/g or more.

The hydroxyl value OHVi of the second resin, which is an amorphous resin, is preferably 50.0 mgKOH/g or less from the viewpoint of improving chargeability under high temperature and high humidity, and is more preferably 30.0 mgKOH/g or less. The lower limit is not particularly limited, but is preferably 0 mgKOH/g or more, and, from the viewpoint of improving the charge rising performance, is preferably 0.5 mgKOH/g or more, more preferably 1.0 mgKOH/g or more.

The weight-average molecular weight (Mw) of the tetrahydrofuran (THF)-soluble matter of the second resin, which is an amorphous resin, measured by gel permeation chromatography (GPC) is preferably 20,000 or more and 1,000,000 or less, more preferably 50,000 or more and 150,000 or less. A case in which the weight-average molecular weight (Mw) of the THF-soluble matter falls within the above-mentioned ranges is preferred because, in this case, elasticity around room temperature can be easily maintained.

The content of the tetrahydrofuran (THF)-insoluble matter in the second resin is preferably 3 mass % or more from the viewpoint of the hot offset resistance.

In addition, the weight-average molecular weight Mw1 of the tetrahydrofuran (THF)-soluble matter of the first resin measured by gel permeation chromatography (GPC), and the weight-average molecular weight Mw2 of the THF-soluble matter of the first resin measured by GPC satisfy a relationship of preferably $Mw2/Mw1 \geq 1.5$, more preferably $Mw2/Mw1 \geq 2.0$. A case in which this relationship is satisfied is preferred because it becomes easy to control T10-T1 to the range of the present disclosure.

In addition, the softening point Tm of the second resin, which is an amorphous resin, is preferably 100° C. or more from the viewpoint of image failure suppression. The upper limit thereof is preferably 160° C. or less, more preferably 140° C. or less, still more preferably 130° C. or less. Further, the softening point Tm is preferably 110° C. or more from the viewpoint of facilitating the control of T1-T10 to the range of the present disclosure.

The binder resin may contain a resin other than the first resin, the second resin, and the third resin, for the purpose of, for example, improving pigment dispersibility, to such an extent that the effect of the present disclosure is not impaired. Examples of such resin include the following.

Polyvinyl chloride, a phenol resin, a natural resin-modified phenol resin, a natural resin-modified maleic acid resin, polyvinyl acetate, a silicone resin, a polyester resin, a polyurethane resin, a polyamide resin, a furan resin, an epoxy resin, a xylene resin, polyvinylbutyral, a terpene resin, a coumarone-indene resin, and a petroleum-based resin.

The toner particle may contain a colorant. Examples of the colorant include the following.

As a black colorant, there are given, for example: carbon black; and a colorant toned to a black color with a yellow colorant, a magenta colorant, and a cyan colorant. Although a pigment may be used alone as the colorant, a dye and the pigment are preferably used in combination to improve the clarity of the colorant in terms of the quality of a full-color image.

As a pigment for magenta toner, there are given, for example:

C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, or 282; C.I. Pigment Violet 19; and C.I. Vat Red 1, 2, 10, 13, 15, 23, 29, or 35.

As a dye for magenta toner, there are given, for example: oil-soluble dyes, such as: C.I. Solvent Red 1, 3, 8, 23, 24, 25, 27, 30, 49, 81, 82, 83, 84, 100, 109, or 121; C.I. Disperse Red 9; C.I. Solvent Violet 8, 13, 14, 21, or 27; and C.I. Disperse Violet 1; and basic dyes, such as: C.I. Basic Red 1, 2, 9, 12, 13, 14, 15, 17, 18, 22, 23, 24, 27, 29, 32, 34, 35, 36, 37, 38, 39, or 40; and C.I. Basic Violet 1, 3, 7, 10, 14, 15, 21, 25, 26, 27, or 28.

As a pigment for cyan toner, there are given, for example: C.I. Pigment Blue 2, 3, 15:2, 15:3, 15:4, 16, or 17; C.I. Vat Blue 6; C.I. Acid Blue 45; and a copper phthalocyanine pigment in which a phthalocyanine skeleton is substituted by 1 to 5 phthalimidomethyl groups.

For example, C.I. Solvent Blue 70 is given as a dye for cyan toner.

As a pigment for yellow toner, there are given, for example:

C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, or 185; and C.I. Vat Yellow 1, 3, or 20.

For example, C.I. Solvent Yellow 162 is given as a dye for yellow toner.

The content of the colorant is preferably from 0.1 part by mass to 30.0 parts by mass with respect to 100 parts by mass of the binder resin.

The toner particle may contain a wax. Examples of the wax include the following.

Hydrocarbon-based waxes, such as microcrystalline wax, paraffin wax, and Fischer-Tropsch wax; oxides of hydrocarbon-based waxes, such as polyethylene oxide wax, or block copolymers thereof, waxes each containing a fatty acid ester as a main component, such as camauba wax; and waxes obtained by partially or wholly deacidifying fatty acid esters, such as deacidified carnauba wax.

Further, the examples include the following: saturated linear fatty acids, such as palmitic acid, stearic acid, and montanoic acid; unsaturated fatty acids, such as brassidic acid, eleostearic acid, and parinaric acid; saturated alcohols, such as stearyl alcohol, aralkyl alcohol, behenyl alcohol, carnaubyl alcohol, ceryl alcohol, and melissyl alcohol; polyhydric alcohols, such as sorbitol; esters of fatty acids, such as palmitic acid, stearic acid, behenic acid, and montanoic acid, and alcohols, such as stearyl alcohol, aralkyl alcohol, behenyl alcohol, carnaubyl alcohol, ceryl alcohol, and melissyl alcohol; fatty acid amides, such as linoleamide, oleamide, and lauramide; saturated fatty acid bisamides, such as methylenebisstearamide, ethylenebiscapramide, ethylenebislauramide, and hexamethylenebisstearamide; unsaturated fatty acid amides, such as ethylenebisoleamide, hexamethylenebisoleamide, N,N'-dioleyladipamide, and N,N'-dioleylsebacamide; aromatic bisamides, such as m-xylenebisstearamide and N,N'-distearylisophthalamide; aliphatic metal salts (generally called metal soaps), such as calcium stearate, calcium laurate, zinc stearate, and magnesium stearate; waxes each obtained by grafting a vinyl-based monomer, such as styrene or acrylic acid, to an aliphatic hydrocarbon-based wax; partially esterified products of fatty acids and polyhydric alcohols, such as behenic acid monoglyceride; and methyl ester compounds each having a hydroxy group obtained by hydrogenation of a plant oil and fat.

The content of the wax is preferably from 2.0 parts by mass to 30.0 parts by mass with respect to 100 parts by mass of the binder resin.

Further, when the toner contains the wax, the temperature Tp at the maximum endothermic peak of the first resin and the temperature Tw at the maximum endothermic peak of the wax satisfy preferably a relationship of $10 \leq Tw-Tp \leq 45$, more preferably a relationship of $20 \leq Tw-Tp \leq 40$. In general, the wax has a low molecular weight as compared to the first resin, and hence is likely to have a low viscosity after melting as compared to the first resin. The above-mentioned relationship is preferred because the melting of the wax at the time of the application of heat becomes slow as compared to that of the crystalline resin, to thereby suppress the sticking of a low-viscosity component to an image-bearing member or the like to facilitate the suppression of the occurrence of an image failure.

The toner particle may contain a charge control agent. Although a known charge control agent may be utilized as the charge control agent, a metal compound of an aromatic carboxylic acid is particularly preferred because the compound is colorless, increases the charging speed of the toner, and can stably hold a constant charge quantity.

As a negative charge control agent, there are given, for example: a salicylic acid metal compound; a naphthoic acid metal compound; a dicarboxylic acid metal compound; a polymer-type compound having a sulfonic acid or a carboxylic acid in a side chain thereof; a polymer-type compound having a sulfonate or a sulfonic acid esterified product in a side chain thereof; a polymer-type compound having a carboxylate or a carboxylic acid esterified product in a side chain thereof; a boron compound; a urea compound; a silicon compound; and a calixarene. The charge control agent may be internally added to the toner particle, or may be externally added thereto.

The content of the charge control agent is preferably from 0.2 part by mass to 10.0 parts by mass with respect to 100 parts by mass of the binder resin.

The toner may contain an external additive. For example, the toner may be obtained by externally adding the external additive to the toner particle. The external additive is preferably inorganic fine particles, such as silica fine particles, titanium oxide fine particles, or aluminum oxide fine particles.

An external additive for improving the fluidity of the toner is preferably inorganic fine particles having a specific surface area of from 50 $m^2/g$ to 400 $m^2/g$, and an external additive for improving the durability thereof is preferably inorganic fine particles having a specific surface area of from 10 $m^2/g$ to 50 $m^2/g$.

Inorganic fine particles having specific surface areas in the ranges may be used in combination for improving both the fluidity and durability of the toner.

The content of the external additive is preferably from 0.1 part by mass to 10.0 parts by mass with respect to 100 parts by mass of the toner particle. It is appropriate to use a known mixer, such as a Henschel mixer, in the mixing of the toner particle and the external additive.

The toner, which may be used as a one-component developer, is preferably used as a two-component developer by being mixed with a magnetic carrier for further improving its dot reproducibility because a stable image can be obtained over a long time period. That is, a two-component developer containing a toner and a magnetic carrier, wherein the toner is the above-mentioned toner, is preferred.

Examples of the magnetic carrier may include generally known magnetic carriers, such as: iron powder or surface-oxidized iron powder; particles of metals, such as iron, lithium, calcium, magnesium, nickel, copper, zinc, cobalt, manganese, chromium, and a rare earth, particles made of alloys thereof, and particles made of oxides thereof; a magnetic material, such as ferrite; and a magnetic material-dispersed resin carrier (so-called resin carrier) containing a magnetic material and a binder resin holding the magnetic material under a state in which the magnetic material is dispersed therein.

When the toner is mixed with the magnetic carrier and used as the two-component developer, the content of the toner in the two-component developer is preferably from about 2 mass % to about 15 mass %, more preferably from about 4 mass % to about 13 mass %.

A production method for the toner particle is not particularly limited, and a conventionally known production method, such as a suspension polymerization method, an emulsion aggregation method, a melt-kneading method, or a dissolution suspension method, may be adopted.

The melt-kneading method is taken as an example and described below, but the production method is not limited thereto.

First, in a raw material-mixing step, predetermined amounts of a first resin and a second resin, or a binder resin containing the first resin and the second resin, and as required, any other component, such as a wax, a colorant, or a charge control agent, serving as constituent materials for the toner particle are weighed, and the materials are blended and mixed. A mixing apparatus is, for example, a double cone mixer, a V-type mixer, a drum-type mixer, a super mixer, a Henschel mixer, a Nauta mixer, or MECHANO HYBRID (manufactured by Nippon Coke & Engineering Co., Ltd.).

Next, the mixed materials are melt-kneaded to disperse the other component in the binder resin containing the first resin and the second resin. In the melt-kneading step, a batch-type kneader, such as a pressure kneader or a Banbury mixer, or a continuous kneader may be used, and a single-screw or twin-screw extruder has been in the mainstream because of the following superiority: the extruder can perform continuous production. Examples thereof include a KTK-type twin-screw extruder (manufactured by Kobe Steel, Ltd.), a TEM-type twin-screw extruder (manufactured by Toshiba Machine Co., Ltd.), a PCM kneader (manufactured by Ikegai Ironworks Corp), a twin-screw extruder (manufactured by K.C.K.), a co-kneader (manufactured by Buss), and KNEADEX (manufactured by Nippon Coke & Engineering Co., Ltd.). Further, a resin composition obtained by the melt-kneading may be rolled with a twin-roll mill or the like, and may be cooled with water or the like in a cooling step.

The dispersion states of the first resin and the second resin, the number-average diameter of the domains, and the like may be controlled based on, for example, kneading temperature and the number of screw rotations in the melt-kneading step.

Next, the cooled product of the resin composition is pulverized into a desired particle diameter in a pulverizing step. In the pulverizing step, it is appropriate that the cooled product be coarsely pulverized with a pulverizer, such as a crusher, a hammer mill, or a feather mill, and be then further finely pulverized with, for example, KRYPTRON SYSTEM (manufactured by Kawasaki Heavy Industries, Ltd.), SUPER ROTOR (manufactured by Nisshin Engineering Inc.), TURBO MILL (manufactured by Turbo Kogyo Co., Ltd.), or a fine pulverizer based on an air jet system.

After that, it is appropriate that, as required, the finely pulverized product be classified with a classifier or a sifter, such as: ELBOW-JET (manufactured by Nittetsu Mining Co., Ltd.) based on an inertial classification system, or TURBOPLEX (manufactured by Hosokawa Micron Corporation), TSP SEPARATOR (manufactured by Hosokawa Micron Corporation), or FACULTY (manufactured by Hosokawa Micron Corporation) based on a centrifugal force classification system, to provide a toner particle.

Next, a case in which the toner particle is produced by the emulsion aggregation method is described.

In the emulsion aggregation method, the toner particle is produced through, for example, a dispersing step of producing dispersion liquids of fine particles formed of the constituent materials for the toner particle, an aggregating step including aggregating the fine particles formed of the constituent materials for the toner particle, and controlling a particle diameter until the particle diameter of the toner particle is obtained, a fusing step of fusing the resins contained in the resultant aggregated particle, a subsequent cooling step, a metal-removing step of separating the resultant toner by filtration to remove excess polyvalent metal ions, a filtering/washing step of washing the toner particle with ion-exchanged water or the like, and a step of drying the washed toner particle by removing water therefrom.

<Step of Preparing Resin Fine Particle Dispersion Liquid (Dispersing Step)>

A resin fine particle dispersion liquid may be prepared by any of known methods, but is not limited to these techniques. Examples of the known methods include: an emulsion polymerization method; a self-emulsification method; a phase-inversion emulsification method involving emulsifying a resin by gradually adding an aqueous medium to a solution of the resin dissolved in an organic solvent; and a forced emulsification method involving forcibly emulsifying a resin through high-temperature treatment in an aqueous medium without using an organic solvent.

Specifically, the first resin or the second resin is dissolved in an organic solvent capable of dissolving the resin, and as required, a surfactant or a basic compound is added. At this time, when the resin is a crystalline resin having a melting point, the resin may be dissolved by being heated to a temperature equal to or higher than its melting point. Subsequently, while stirring is performed with a homogenizer or the like, an aqueous medium is slowly added to precipitate resin fine particles. After that, the solvent is removed through heating or pressure reduction. Thus, an aqueous dispersion liquid of the resin fine particles is produced.

Any organic solvent capable of dissolving the resin may be used as the organic solvent to be used to dissolve the resin, but an organic solvent that forms a uniform phase with water, such as toluene, is preferably used from the viewpoint of suppressing the generation of coarse powder.

The surfactant is not particularly limited, but examples thereof include: anionic surfactants, such as sulfate-based, sulfonate-based, carboxylate-based, phosphate-based, and soap-based surfactants; cationic surfactants, such as amine salt-type and quaternary ammonium salt-type surfactants; and nonionic surfactants, such as polyethylene glycol-based, alkylphenol ethylene oxide adduct-based, and polyhydric alcohol-based surfactants. The surfactants may be used alone or in combination thereof.

Examples of the basic compound include: inorganic bases, such as sodium hydroxide and potassium hydroxide; and organic bases, such as ammonia, triethylamine, trimethylamine, dimethylaminoethanol, and diethylaminoethanol. The basic compounds may be used alone or in combination thereof.

In addition, the 50% particle diameter (D50) of the resin fine particles in the aqueous dispersion liquid of the resin fine particles on a volume basis is preferably from about 0.05 μm to about 1.00 μm, more preferably from about 0.05 μm to about 0.40 μm. When the 50% particle diameter (D50) on a volume basis is adjusted to fall within the above-mentioned ranges, toner particles having a weight-average particle diameter of from 3 μm to 10 μm, which is appropriate for toner particles, can be easily obtained.

It is appropriate that a dynamic light scattering-type particle size distribution meter Nanotrac UPA-EX150 (manufactured by Nikkiso Co., Ltd.) be used for the measurement of the 50% particle diameter (D50) on a volume basis.

<Preparation of Colorant Fine Particle Dispersion Liquid>

A colorant fine particle dispersion liquid may be prepared by any of known methods given below, but is not limited to these techniques.

The colorant fine particle dispersion liquid may be prepared by mixing a colorant, an aqueous medium, and a dispersant through use of a known mixing machine, such as a stirrer, an emulsifying machine, or a dispersing machine. Known dispersants, such as a surfactant and a polymer dispersant, may each be used as the dispersant to be used in this case.

Each of the surfactant and the polymer dispersant serving as the dispersant can be removed in the washing step to be described later, but the surfactant is preferred from the viewpoint of washing efficiency.

Examples of the surfactant include: anionic surfactants, such as sulfate-based, sulfonate-based, phosphate-based, and soap-based surfactants; cationic surfactants, such as amine salt-type and quaternary ammonium salt-type surfactants; and nonionic surfactants, such as polyethylene glycol-based, alkylphenol ethylene oxide adduct-based, and polyhydric alcohol-based surfactants.

Of those, a nonionic surfactant or an anionic surfactant is preferred. In addition, the nonionic surfactant and the anionic surfactant may be used in combination. The surfactants may be used alone or in combination thereof. The concentration of the surfactant in the aqueous medium is preferably from about 0.5 mass % to about 5 mass %.

The content of colorant fine particles in the colorant fine particle dispersion liquid is not particularly limited, but is preferably from 1 mass % to 30 mass % with respect to the total mass of the colorant fine particle dispersion liquid.

In addition, with regard to the dispersed particle diameter of the colorant fine particles in the aqueous dispersion liquid of the colorant, a 50% particle diameter (D50) on a volume basis is preferably 0.50 m or less from the viewpoint of the dispersibility of the colorant in the toner particle to be finally obtained. In addition, for the same reason, a 90% particle diameter (D90) on a volume basis is preferably 2 μm or less. It is appropriate that the 50% particle diameter (D50) of the colorant fine particles dispersed in the aqueous medium on a volume basis be measured with a dynamic light scattering-type particle size distribution meter (Nanotrac UPA-EX150: manufactured by Nikkiso Co., Ltd.).

Examples of the known mixing machines, such as the stirrer, the emulsifying machine, and the dispersing machine, to be used in dispersing the colorant in the aqueous medium include an ultrasonic homogenizer, a jet mill, a pressure-type homogenizer, a colloid mill, a ball mill, a sand mill, and a paint shaker. Those mixing machines may be used alone or in combination thereof.

<Preparation of Wax Fine Particle Dispersion Liquid>

A wax fine particle dispersion liquid may be prepared by any of known methods given below, but is not limited to these techniques.

The wax fine particle dispersion liquid may be produced by adding a wax to an aqueous medium containing a surfactant, heating the mixture to a temperature equal to or higher than the melting point of the wax, and dispersing the mixture into particles with a homogenizer having a strong shear application capability (e.g., "Clearmix W-Motion" manufactured by M Technique Co., Ltd.) or a pressure discharge-type dispersing machine (e.g., "Gaulin Homogenizer" manufactured by Gaulin), followed by cooling to a temperature lower than the melting point.

With regard to the dispersed particle diameter of the wax fine particle dispersion liquid in the aqueous dispersion liquid of the wax, a 50% particle diameter (D50) on a volume basis is preferably from about 0.03 μm to about 1.0 μm, more preferably from 0.10 μm to 0.50 μm. In addition, it is preferred that coarse particles of 1 μm or more be absent.

When the dispersed particle diameter of the wax fine particle dispersion liquid falls within the above-mentioned ranges, the wax can be caused to be present as a fine dispersion in the toner particle, and hence an exudation effect at the time of fixation can be maximally expressed to provide satisfactory separability. It is appropriate that the 50% particle diameter (D50) of the wax fine particle dispersion liquid dispersed in the aqueous medium on a volume basis be measured with a dynamic light scattering-type particle size distribution meter (Nanotrac UPA-EX150: manufactured by Nikkiso Co., Ltd.).

<Mixing Step>

In the mixing step, a mixed liquid is prepared by mixing a first resin fine particle dispersion liquid and a second resin fine particle dispersion liquid, and as required, for example, the wax fine particle dispersion liquid and the colorant fine particle dispersion liquid. It is appropriate that the mixing step be performed using any of known mixing apparatus, such as a homogenizer and a mixer.

<Step of Forming Aggregate Particle (Aggregating Step)>

In the aggregating step, the fine particles contained in the mixed liquid prepared in the mixing step are aggregated to form an aggregate having a target particle diameter. At this time, an aggregating agent is added and mixed as required, and at least one of heating or mechanical power is applied as appropriate. Thus, an aggregate is formed in which the resin fine particles, and as required, for example, the wax fine particles and the colorant fine particles are aggregated.

As the aggregating agent, as required, an aggregating agent containing a metal ion that is divalent or more may be used.

The aggregating agent containing a metal ion that is divalent or more has a high aggregating force, and hence can achieve the purpose by being added in a small amount. Such aggregating agent can also ionically neutralize ionic surfactants contained in the resin fine particle dispersion liquids, the wax fine particle dispersion liquid, and the colorant fine particle dispersion liquid. As a result, by virtue of the effects of salting-out and ionic crosslinking, the aggregation of the resin fine particles, the wax fine particles, and the colorant fine particles is facilitated.

The aggregating step is a step of forming aggregates having the sizes of the toner particles in an aqueous medium. The weight-average particle diameter of the aggregates produced in the aggregating step is preferably from 3 μm to 10 μm. It is appropriate that the weight-average particle diameter be measured with a particle size distribution analyzer based on a Coulter method (Coulter Multisizer III: manufactured by Coulter).

<Fusing Step>

In the fusing step, an aggregation inhibitor may be added to the dispersion liquid containing the aggregate obtained in the aggregating step under stirring similar to that in the aggregating step. An example of the aggregation inhibitor is a basic compound that moves the equilibrium of an acidic polar group of a surfactant to a dissociation side to stabilize the aggregated particle. Another example is a chelating agent that partially dissociates ionic crosslinking between an acidic polar group of a surfactant and a metal ion serving as the aggregating agent to form a coordination bond with the metal ion, to thereby stabilize the aggregated particle.

It is appropriate that, after the dispersion state of the aggregated particles in the dispersion liquid has become stable through the action of the aggregation inhibitor, the aggregated particles be fused by heating to a temperature equal to or higher than the glass transition temperature or melting point of the resin.

The number-average diameter of the domains may be controlled by adjusting the temperature at the time of the fusion. The weight-average particle diameter of the resultant toner particles is preferably from about 3 μm to about 10 μm.

<Filtering Step, Washing Step, Drying Step, and Classifying Step>

After that, it is appropriate to perform a filtering step of separating the solid content of the toner particles by filtration, and as required, a washing step, a drying step, and a classifying step for particle size adjustment, to thereby provide the toner particles.

The resultant toner particles may be used as they are as the toner. The toner may be obtained by mixing the resultant toner particles with inorganic fine particles, and as required, any other external additive. The mixing of the toner particles with the inorganic fine particles and the other external additive may be performed with a mixing apparatus, such as a double cone mixer, a V-type mixer, a drum-type mixer, a super mixer, a Henschel mixer, a Nauta mixer, MECHANO HYBRID (manufactured by Nippon Coke & Engineering Co., Ltd.), or NOBILTA (manufactured by Hosokawa Micron Corporation).

Methods of measuring the various physical properties of the toner and the raw materials therefor are described below.

<Cross-sectional Observation of Toner Particle, and Measurement of Domain-Matrix Structure>

First, slices serving as reference samples for abundances are produced.

The first resin, which is a crystalline resin, is sufficiently dispersed in a visible light-curable resin (Aronix LCR series D800), followed by irradiation with short-wavelength light to cause curing. The resultant cured product is cut with an ultramicrotome including a diamond knife to produce a 250 nm sliced sample. Similarly, a sliced sample is also produced for the second resin, which is an amorphous resin.

In addition, the first resin and the second resin are mixed at 0/100, 30/70, 70/30, and 100/0 on a mass basis, and the mixtures are melt-kneaded to produce kneaded products. Each of these kneaded products is similarly dispersed in the visible light-curable resin, which is cured, followed by cutting to produce a sliced sample.

Then, for the cut-out samples, cross-sections of those reference samples are observed using a transmission electron microscope (Electron Microscope JEM-2800 manufactured by JEOL Ltd.) (TEM-EDX), and elemental mapping is performed using EDX. Elements to be mapped are carbon, oxygen, and nitrogen.

Mapping conditions are set as described below.

Acceleration voltage: 200 kV
Electron beam irradiation size: 1.5 nm
Live time limit: 600 sec
Dead time: 20 sec to 30 sec
Mapping resolution: 256×256

Based on the spectral intensity (average in a 10 nm square area) of each element, (oxygen element intensity/carbon element intensity) and (nitrogen element intensity/carbon element intensity) are calculated, and calibration curves are prepared with respect to the mass ratio between the first resin and the second resin. When a monomer unit of the first resin contains a nitrogen atom, subsequent quantification is performed using the (nitrogen element intensity/carbon element intensity) calibration curve. When the binder resin contains the third resin, it is appropriate that a calibration curve be similarly prepared.

Next, the analysis of a toner sample is performed.

The toner is sufficiently dispersed in a visible light-curable resin (Aronix LCR series D800), followed by irradiation with short-wavelength light to cause curing. The resultant cured product is cut with an ultramicrotome including a diamond knife to produce a 250 nm sliced sample.

Then, the cut-out sliced sample is observed using a transmission electron microscope (Electron Microscope JEM-2800 manufactured by JEOL Ltd.) (TEM-EDX). Cross-sectional images of the toner particles are acquired, and elemental mapping is performed using EDX. Elements to be mapped are carbon, oxygen, and nitrogen.

The toner particle cross-sections to be observed are selected as described below. First, the cross-sectional area of each of the toner particles is determined from the toner particle cross-sectional images, and the diameter (circle-equivalent diameter) of a circle having an area equal to the cross-sectional area is determined. Only the cross-sectional images of toner particles for each of which the absolute value of a difference between the circle-equivalent diameter and the weight-average particle diameter (D4) of the toner is 1.0 μm or less are analyzed.

For the matrix/domains recognized from the cross-sectional images, (oxygen element intensity/carbon element intensity) and/or (nitrogen element intensity/carbon element intensity) is calculated based on the spectral intensity (average in a 10 nm square) of each element, and compared to the calibration curves to calculate the ratio (%) of the first resin in the matrix and the ratio (%) of the second resin in the domains. The calibration curves are prepared on a mass basis, and hence the ratios to be calculated are on a mass basis.

The domains recognized through the observed images are identified, and then the particle diameters of the domains present in the toner particle cross-sectional images are determined through binarization processing. The particle diameters are defined as the long diameters of the domains. Ten such particle diameters are measured per toner particle, and similar measurement is performed for 10 toner particles. The arithmetic average value of the thus obtained particle diameters of the domains is defined as the "number-average diameter (μm) of the domains."

Meanwhile, with regard to the area of the domains, the areas of all domains each formed of the second resin present in the cross-sectional image of one toner particle are totaled to determine the total area, which is represented by S1. Similar measurement is performed for 100 toner particles present in a sliced sample having the toner dispersed therein, and the total area of the domains (i.e., S1+S2 . . . +S100) is calculated. The arithmetic average value thereof is defined as the "area of the domains". When the number of measurable toner particle cross-sectional images in one sliced sample is less than 100, the measurement is performed using a plurality of sliced samples until the number of toner particle cross-sectional images reaches 100.

With regard to the area of the cross-sections of the toner particles, the total of the cross-sectional areas of 100 toner particles determined from the toner particle cross-sectional images used in the determination of the area of the domains is determined, and the arithmetic average value thereof is defined as the "area of the cross-sections of the toner particles."

Then, [area of domains]/[area of cross-sections of toner particles]×100 is defined as the ratio of the area of the domains to the area of the cross-sections of the toner particles (area ratio (%) of the domains).

Image Pro PLUS (manufactured by Nippon Roper K.K.) is used for the binarization processing and the calculation of the number-average diameter.

<Method of Separating Each Material from Toner>

Each of the materials contained in the toner may be separated from the toner through utilization of differences between the solubilities of the materials in solvents.

First separation: The toner is dissolved in methyl ethyl ketone (MEK) at 23° C. to be separated into soluble matter (the second resin) and insoluble matter (the first resin, the wax, the colorant, the inorganic fine particles, and the like).

Second separation: The insoluble matter (the first resin, the wax, the colorant, the inorganic fine particles, and the like) obtained by the first separation is dissolved in MEK at 100° C. to be separated into soluble matter (the first resin and the wax) and insoluble matter (the colorant, the inorganic fine particles, and the like).

Third separation: The soluble matter (the first resin and the wax) obtained by the second separation is dissolved in chloroform at 23° C. to be separated into soluble matter (the first resin) and insoluble matter (the wax).

(When Binder Resin Contains Third Resin)

First separation: The toner is dissolved in methyl ethyl ketone (MEK) at 23° C. to be separated into soluble matter (the second resin and the third resin) and insoluble matter (the first resin, the wax, the colorant, the inorganic fine particles, and the like).

Second separation: The soluble matter (the second resin and the third resin) obtained by the first separation is dissolved in toluene at 23° C. to be separated into soluble matter (the third resin) and insoluble matter (the second resin).

Third separation: The insoluble matter (the first resin, the wax, the colorant, the inorganic fine particles, and the like) obtained by the first separation is dissolved in MEK at 100° C. to be separated into soluble matter (the first resin and the wax) and insoluble matter (the colorant, the inorganic fine particles, and the like).

Fourth separation: The soluble matter (the first resin and the wax) obtained by the third separation is dissolved in chloroform at 23° C. to be separated into soluble matter (the first resin) and insoluble matter (the wax).

(Measurement of Contents of First Resin and Second Resin in Binder Resin in Toner)

The masses of the soluble matter and insoluble matter in each separation step obtained in the above-mentioned separation are measured, and thereby the contents of the first resin and the second resin in the binder resin in the toner are calculated.

<Methods of Identifying Monomer Units for Forming First, Second, and Third Resins and Measuring Contents Thereof>

The identification of the monomer units for forming the first, second, and third resins and the measurement of the contents thereof are performed by $^1$H-NMR under the following conditions.

Measuring apparatus: A FT NMR apparatus JNM-EX400 (manufactured by JEOL Ltd.)
Measurement frequency: 400 MHz
Pulse condition: 5.0 μs
Frequency range: 10,500 Hz
Number of scans: 64 times
Measurement temperature: 30° C.
Sample: 50 mg of a measurement sample is loaded into a sample tube having an inner diameter of 5 mm, and deuterated chloroform ($CDCl_3$) is added as a solvent to the tube. The sample is dissolved in the solvent in a thermostat at 40° C. to prepare a solution.

In the resultant $^1$H-NMR chart, a peak independent of a peak assigned to a constituent for any other monomer unit is selected from peaks assigned to constituents for the first monomer unit, and the integrated value $S_1$ of the peak is calculated.

Similarly, in the resultant $^1$H-NMR chart, a peak independent of a peak assigned to a constituent for any other monomer unit is selected from peaks assigned to constituents for the second monomer unit, and the integrated value $S_2$ of the peak is calculated.

Further, when the third monomer unit is present, a peak independent of a peak assigned to a constituent for any other monomer unit is selected from peaks assigned to constituents for the third monomer unit, and the integrated value $S_3$ of the peak is calculated.

The content of the first monomer unit is determined by using the integrated values $S_1$, $S_2$, and $S_3$ as described below. $n_1$, $n_2$, and $n_3$ each represent the number of hydrogen atoms in the constituent to which the peak to which attention has been paid for the corresponding moiety is assigned.

$$\text{Content (mol\%) of first monomer unit} = \{(S_1/n_1)/((S_1/n_1)+(S_2/n_2)+(S_3/n_3))\}\times 100$$

Similarly, the contents of the second monomer unit and the third monomer unit are determined as described below.

$$\text{Content (mol\%) of second monomer unit} = \{(S_2/n_2)/((S_1/n_1)+(S_2/n_2)+(S_3/n_3))\}\times 100$$

$$\text{Content (mol\%) of third monomer unit} = \{(S_3/n_3)/((S_1/n_1)+(S_2/n_2)+(S_3/n_3))\}\times 100$$

When, for example, a polymerizable monomer in which a constituent except a vinyl group is free of any hydrogen atom is used in the first, second, and third resins, the measurement is performed by using $^{13}$C-NMR through use of $^{13}$C as a measurement atomic nucleus in a single-pulse mode, and the content is calculated in the same manner as in $^1$H-NMR.

Based on the molecular weight of a monomer unit, its content may be converted from mol % to mass %.

<Method of Calculating SP Value>

The SP value is determined in accordance with a calculation method proposed by Fedors as described below.

The evaporation energy (Δei) (cal/mol) and molar volume (Δvi) (cm$^3$/mol) of an atom or an atomic group in the molecular structure of each polymerizable monomer are determined from a table shown in "Polym. Eng. Sci., 14(2), 147-154 (1974)." An SP value (J/cm$^3$)$^{0.5}$ was determined as $(4.184\times\Sigma\Delta ei/\Sigma\Delta vi)^{0.5}$.

For example, the $SP_{21}$ is calculated by the same calculation method as that described above for an atom or an atomic group of a molecular structure in a state in which the double bond of the polymerizable monomer is cleaved by its polymerization. That is, it is appropriate that the $SP_{21}$ be determined by dividing the evaporation energy of the monomer unit by the molar volume thereof.

The SP value of a whole resin is determined by arithmetically averaging the SP values of its polymerizable monomers based on their mass ratio.

<Method of Measuring Weight-Average Molecular Weight (Mw) of Resin or the Like Using Gel Permeation Chromatography (GPC)>

The weight-average molecular weight (Mw) of the tetrahydrofuran (THF)-soluble matter of a resin or the like is measured using gel permeation chromatography (GPC) as described below.

First, the resin or the like is dissolved in tetrahydrofuran (THF) at room temperature over 24 hours. Then, the resultant solution is filtered with a solvent-resistant membrane filter "Myshoridisk" (manufactured by Tosoh Corporation) having a pore diameter of 0.2 μm to provide a sample solution. The concentration of a THF-soluble component in the sample solution is adjusted to about 0.8 mass %. Measurement is performed with the sample solution under the following conditions.

Apparatus: HLC 8120 GPC (detector: RI) (manufactured by Tosoh Corporation)
Column: Septuplicate of Shodex KF-801, 802, 803, 804, 805, 806, and 807 (manufactured by Showa Denko K.K.)
Eluent: Tetrahydrofuran (THF)
Flow rate: 1.0 mL/min
Oven temperature: 40.0° C.
Sample injection amount: 0.10 mL At the time of the calculation of the molecular weight of the sample, a molecular weight calibration curve prepared with standard polystyrene resins (product names "TSK Standard Polystyrenes F-850, F-450, F-288, F-128, F-80, F-40, F-20, F-10, F-4, F-2, F-1, A-5000, A-2500, A-1000, and A-500" manufactured by Tosoh Corporation) is used.

<Method of Measuring Melting Point, and Endothermic Peak and Endothermic Quantity of Toner, Resin, or the Like>

The melting point, and the endothermic peak and endothermic quantity of the toner, a resin, or the like are measured using DSC Q1000 (manufactured by TA Instruments) under the following conditions.

Rate of temperature increase: 10° C./min
Measurement start temperature: 20° C.
Measurement end temperature: 180° C.

The melting points of indium and zinc are used for the temperature correction of the detecting portion of the apparatus, and the heat of fusion of indium is used for the correction of a heat quantity.

Specifically, about 5 mg of a sample is precisely weighed, loaded into a pan made of aluminum, and subjected to differential scanning calorimetry. An empty pan made of silver is used as a reference.

The peak temperature at the maximum endothermic peak in a first temperature increase process is defined as the melting point.

The "maximum endothermic peak" refers to the peak at which the endothermic quantity becomes maximum when a plurality of peaks are present. Further, the endothermic quantity at the maximum endothermic peak is determined.

The attribution of each peak may be determined by subjecting each single material separated from the toner described above to DSC.

<Method of Measuring Acid Value>

The "acid value" is the number of milligrams of potassium hydroxide required for neutralizing an acid contained in 1 g of a sample. The acid value is measured in conformity with JIS-K0070-1992, specifically, in accordance with the following procedure.

(1) Preparation of Reagents 1.0 g of phenolphthalein is dissolved in 90 mL of ethyl alcohol (95 vol %), and ion-exchanged water is added to 100 mL to provide a phenolphthalein solution.

7 g of special-grade potassium hydroxide is dissolved in 5 mL of water, and ethyl alcohol (95 vol %) is added to a total volume of 1 L. The resultant is placed in an alkali-resistant container so as not to be brought into contact with a carbon dioxide gas or the like, and is left to stand therein for 3 days, followed by filtration to provide a potassium hydroxide solution. The resultant potassium hydroxide solution is stored in an alkali-resistant container. The factor of the potassium hydroxide solution is determined from the amount of the potassium hydroxide solution required for neutralization when 25 mL of 0.1 mol/L hydrochloric acid is taken in an Erlenmeyer flask and a few drops of the phenolphthalein solution are added, followed by titration with the potassium hydroxide solution. The 0.1 mol/L hydrochloric acid to be used is produced in conformity with JIS-K8001-1998.

(2) Operations (A) Main Test 2.0 g of a pulverized sample is precisely weighed in a 200 mL Erlenmeyer flask, and is dissolved by adding 100 mL of a mixed solution of toluene/ethanol (2:1) over 5 hours. Then, a few drops of the phenolphthalein solution are added as an indicator, and titration is performed with the potassium hydroxide solution. The endpoint of the titration is defined as the point where a pale pink color of the indicator persists for about 30 seconds.

(B) Blank Test

Titration is performed in the same manner as in the above-mentioned operation except that no sample is used (that is, only the mixed solution of toluene/ethanol (2:1) is used).

(3) The acid value is calculated by substituting the obtained results into the following equation:

$$A = [(C - B) \times f \times 5.61]/S$$

where A represents the acid value (mgKOH/g), B represents the addition amount (mL) of the potassium hydroxide solution in the blank test, C represents the addition amount (mL) of the potassium hydroxide solution in the main test, "f" represents the factor of the potassium hydroxide solution, and S represents the mass (g) of the sample.

<Method of measuring Softening Point (Tm) of Resin and T1 and T10 of Toner>

The softening point of the resin and the T1 and T10 of the toner are measured through use of a constant-pressure extrusion system capillary rheometer "flow characteristic-evaluating apparatus Flow Tester CFT-500D" (manufactured by Shimadzu Corporation) in accordance with the manual attached to the apparatus. In this apparatus, a measurement sample filled in a cylinder is increased in temperature to be melted while a predetermined load is applied to the measurement sample with a piston from above, and the melted measurement sample is extruded from a die in a bottom part of the cylinder. At this time, a flow curve representing a relationship between a piston descent amount and the temperature can be obtained.

In addition, a "melting temperature in a ½ method" described in the manual attached to the "flow characteristic-evaluating apparatus Flow Tester CFT-500D" is defined as a softening point. The melting temperature in the ½ method is calculated as described below.

First, ½ of a difference between a descent amount (outflow end point, represented by Smax) of the piston at a time when the outflow is finished and a descent amount (minimum point, represented by Smin) of the piston at a time when the outflow is started is determined (The ½ of the difference is represented by X. X=(Smax−Smin)/2). Then, the temperature in the flow curve when the descent amount of the piston reaches the sum of X and Smin is the melting temperature in the ½ method.

The measurement sample to be used is obtained by subjecting about 1.0 g of the resin to compression molding for about 60 seconds under about 10 MPa through use of a tablet compressing machine (e.g., NT-100H, manufactured by NPa SYSTEM Co., Ltd.) under an environment of 25° C. to form the resin into a cylindrical shape having a diameter of about 10 mm.

Specific operations in the measurement are performed in accordance with the manual attached to the apparatus.

The measurement conditions of the CFT-500D are as described below.

Test mode: heating method
Starting temperature: 40° C.
Reached temperature: 200° C.
Measurement interval: 1.0° C.
Rate of temperature increase: 4.0° C./min
Piston sectional area: 1.000 $cm^2$
Test load (applied pressure): 10.0 kgf (0.9807 MPa)
Preheating time: 300 seconds
Diameter of hole of die: 1.0 mm
Length of die: 1.0 mm In addition, melt viscosities were determined in accordance with the manual attached to the apparatus.

A temperature at which the melt viscosity V1 became $1\times10^5$ Pa·s in measurement at an applied pressure of 0.9807 MPa was represented by T1. In addition, a temperature at which the melt viscosity V10 became $1\times10^5$ Pa·s in similar measurement under the above-mentioned measurement conditions at a test load of 100.0 kgf (applied pressure: 9.807 MPa) was represented by T10.

In the above-mentioned analysis, temperatures at which the melt viscosities became $1\times10^5$ Pa·s were calculated based on a plot of melt viscosity in the region of temperatures equal to or higher than a temperature (outflow start temperature Tfb) at which the outflow of the measurement sample started, and values obtained by rounding off the first decimal places of the calculated temperatures were adopted as T1 and T10 in the present disclosure.

<Method of measuring Weight-average Particle Diameter (D4) of Toner (Particle)>

The weight-average particle diameter (D4) of the toner (particle) is measured with the number of effective measurement channels of 25,000 by using a precision particle size distribution-measuring apparatus based on a pore electrical resistance method provided with a 100 μm aperture tube "Coulter Counter Multisizer 3" (trademark, manufactured by Beckman Coulter, Inc.) and dedicated software included therewith "Beckman Coulter Multisizer 3 Version 3.51" (manufactured by Beckman Coulter, Inc.) for setting measurement conditions and analyzing measurement data. Then, the measurement data is analyzed to calculate the diameter.

An electrolyte aqueous solution prepared by dissolving guaranteed sodium chloride in ion-exchanged water so as to have a concentration of about 1 mass %, such as "ISOTON II" (manufactured by Beckman Coulter, Inc.), may be used in the measurement.

The dedicated software is set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 μm or more and 60 μm or less.

A specific measurement method is as described below.

(1) About 200 mL of the electrolyte aqueous solution is charged into a 250 mL round-bottom beaker made of glass dedicated for the Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "aperture tube flush" function of the dedicated software.

(2) About 30 mL of the electrolyte aqueous solution is charged into a 100 mL flat-bottom beaker made of glass. About 0.3 mL of a diluted solution prepared by diluting "Contaminon N" (a 10 mass % aqueous solution of a neutral detergent for washing a precision measuring device formed of a nonionic surfactant, an anionic surfactant, and an organic builder and having a pH of 7 manufactured by Wako Pure Chemical Industries, Ltd.) with ion-exchanged water by three mass fold is added as a dispersant to the electrolyte aqueous solution.

(3) A predetermined amount of ion-exchanged water is charged into the water tank of an ultrasonic dispersing unit "Ultrasonic Dispersion System Tetora 150" (manufactured by Nikkaki Bios Co., Ltd.) having an electrical output of 120 W in which two oscillators each having an oscillatory frequency of 50 kHz are built so as to be out of phase by 180°. About 2 mL of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted in order that the liquid level of the electrolyte aqueous solution in the beaker may resonate with an ultrasonic wave from the ultrasonic dispersing unit to the fullest extent possible.

(5) About 10 mg of toner (particle) is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted to 10° C. or more and 40° C. or less in the ultrasonic dispersion.

(6) The electrolyte aqueous solution in the section (5) in which the toner (particle) has been dispersed is added dropwise with a pipette to the round-bottom beaker in the section (1) placed in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the weight-average particle diameter (D4) is calculated. An "average diameter" on the "analysis/volume statistics (arithmetic average)" screen of the dedicated software when the dedicated software is set to show a graph in a vol % unit is the weight-average particle diameter (D4).

<Method of measuring 50% Particle Diameters (D50) of Resin Fine Particles, Wax Fine Particles, and Colorant Fine Particles on Volume Basis>

A dynamic light scattering-type particle size distribution meter Nanotrac UPA-EX150 (manufactured by Nikkiso Co., Ltd.) is used for the measurement of the 50% particle diameter (D50) of the fine particles of each kind on a volume basis. Specifically, the measurement is performed in accordance with the following procedure.

In order to prevent the aggregation of a measurement sample, a dispersion liquid having the measurement sample dispersed therein is charged into an aqueous solution containing Family Fresh (manufactured by Kao Corporation), and the whole is stirred. After the stirring, the measurement sample is injected into the above-mentioned apparatus and subjected to measurement twice, and the average value thereof is determined.

Measurement conditions are set to: a measurement time of 30 seconds; a refractive index of sample particles of 1.49; water serving as a dispersion medium; and a refractive index of the dispersion medium of 1.33.

The volume particle size distribution of the measurement sample is measured, and a particle diameter at which a cumulative volume from a smaller particle diameter side in the cumulative volume distribution becomes 50% based on the measurement results is defined as the 50% particle diameter (D50) of the fine particles of each kind on a volume basis.

EXAMPLES

The present disclosure is specifically described by way of the following Examples. However, the present disclosure is by no means limited thereto. In the following formulations, the term “part(s)” always means “part(s) by mass” unless otherwise specified.

Production Example of First Resin 1 (Crystalline Resin 1)

| | |
|---|---|
| Solvent: toluene | 100.0 parts |
| Monomer composition | 100.0 parts |
| (The monomer composition is a composition obtained by mixing the following behenyl acrylate, acrylonitrile, acrylic acid, and styrene at the ratio shown below) | |
| Behenyl acrylate | 58.0 parts |
| Acrylonitrile | 10.0 parts |
| Acrylic acid | 2.0 parts |
| Styrene | 30.0 parts |
| Polymerization initiator | 0.5 part |
| [t-butyl peroxypivalate (manufactured by NOF Corporation: PERBUTYL PV) | |

Under a nitrogen atmosphere, the above-mentioned materials were loaded into a reaction vessel including a reflux condenser, a stirring machine, a temperature gauge, and a nitrogen-introducing tube. While the materials in the reaction vessel were stirred at 200 rpm, the materials were heated to 70° C. and subjected to a polymerization reaction for 12 hours. Thus, such a dissolved liquid that the polymer of a monomer composition was dissolved in toluene was obtained.

Subsequently, the temperature of the dissolved liquid was reduced to 25° C., and then the dissolved liquid was loaded into 1,000.0 parts of methanol while methanol was stirred. Thus, methanol-insoluble matter was precipitated. The resultant methanol-insoluble matter was separated by filtration, and was washed with methanol, followed by vacuum drying at 40° C. for 24 hours. Thus, a first resin 1 (crystalline resin 1) was obtained. Its physical properties are shown in Table 2 and Table 3.

<Production Examples of First Resins 2 to 12 (Crystalline Resins 2 to 12)>

First resins 2 to 12 (crystalline resins 2 to 12) were obtained by performing reactions in the same manner as in the production example of the first resin 1 (crystalline resin 1) except that the respective monomers and the numbers of parts by mass thereof were changed as shown in Table 1-1. Their physical properties are shown in Table 2 and Table 3.

TABLE 1-1

| Crystalline | First polymerizable monomer | | Second polymerizable monomer | | Third polymerizable monomer | |
|---|---|---|---|---|---|---|
| resin | Kind | Parts | Kind | Parts | Kind | Parts |
| 1 | BEA | 58.0 | AN<br>AA | 10.0<br>2.0 | St | 30.0 |
| 2 | BEA | 58.0 | AA | 2.0 | St | 40.0 |
| 3 | BEA | 30.0 | AA | 2.0 | St | 68.0 |
| 4 | BEA | 45.0 | AA | 2.0 | St | 53.0 |
| 5 | BEA | 76.0 | AA | 2.0 | St | 22.0 |
| 6 | BEA | 15.0 | AA | 2.0 | St | 83.0 |
| 7 | BEA | 84.0 | AA | 2.0 | St | 14.0 |
| 8 | STA | 84.0 | AA | 2.0 | St | 14.0 |
| 9 | UDA | 84.0 | AA | 2.0 | St | 14.0 |
| 10 | HA | 84.0 | AA | 2.0 | St | 14.0 |
| 11 | BEA | 98.0 | AA | 2.0 | — | — |
| 12 | MYA | 84.0 | AA | 2.0 | St | 14.0 |

<Production Example of First Resin 13 (Crystalline Resin 13)>

1,6-Hexanediol: 39.7 parts (100.0 mol % with respect to the total number of moles of the polyhydric alcohol)

Adipic acid: 29.4 parts (60.0 mol % with respect to the total number of moles of the polyvalent carboxylic acids)

Dodecanedioic acid: 30.9 parts (40.0 mol % with respect to the total number of moles of the polyvalent carboxylic acids)

Tin 2-ethylhexanoate: 0.5 part

The above-mentioned materials were weighed in a reaction vessel with a cooling tube, a stirrer, a nitrogen-introducing tube, and a thermocouple. The flask was purged with a nitrogen gas. After that, a temperature in the flask was gradually increased while the mixture was stirred. The mixture was subjected to a reaction for 3 hours while being stirred at a temperature of 140° C.

Next, a pressure in the reaction vessel was reduced to 8.3 kPa, and a reaction was performed for 4 hours while the temperature was maintained at 200° C.

After that, the pressure in the reaction vessel was reduced to 5 kPa or less, and a reaction was performed at 200° C. for 3 hours to provide a first resin 13 (crystalline resin 13).

<Production Examples of First Resins 14 to 17 (Crystalline Resins 14 to 17)>

First resins 14 to 17 were obtained by performing production in the same manner as in the production example of the first resin 13 except that the alcohol component and the carboxylic acid component were changed to monomers shown in Table 1-2. Their physical properties are shown in Table 2 and Table 3.

TABLE 1-2

| Crystalline | Alcohol component | | Carboxylic acid component | |
|---|---|---|---|---|
| resin | Kind | mol % | Kind | mol % |
| 13 | HO | 50.0 | AA<br>DDA | 30.0<br>20.0 |
| 14 | HO | 50.0 | DDA | 50.0 |
| 15 | DDO | 50.0 | DDA | 50.0 |
| 16 | EG | 50.0 | DDA | 50.0 |
| 17 | EG | 50.0 | AA | 50.0 |

TABLE 2-1

| Crystalline resin | First polymerizable monomer Unit | $SP_{11}$ | Second polymerizable monomer Unit | $SP_{21}$ | Third polymerizable monomer Unit | $SP_{31}$ | SP value of resin SP1 |
|---|---|---|---|---|---|---|---|
| 1 | BEA | 18.25 | AN | 29.43 | St | 20.11 | 20.1 |
| | | | AA | 28.72 | | | |
| 2 | BEA | 18.25 | AA | 28.72 | St | 20.11 | 19.8 |
| 3 | BEA | 18.25 | AA | 28.72 | St | 20.11 | 20.3 |
| 4 | BEA | 18.25 | AA | 28.72 | St | 20.11 | 20.0 |
| 5 | BEA | 18.25 | AA | 28.72 | St | 20.11 | 19.4 |
| 6 | BEA | 18.25 | AA | 28.72 | St | 20.11 | 20.6 |
| 7 | BEA | 18.25 | AA | 28.72 | St | 20.11 | 19.3 |
| 8 | STA | 18.39 | AA | 28.72 | St | 20.11 | 19.4 |
| 9 | UDA | 18.25 | AA | 28.72 | St | 20.11 | 19.3 |
| 10 | HA | 18.47 | AA | 28.72 | St | 20.11 | 19.5 |
| 11 | BEA | 18.25 | AA | 28.72 | — | — | 19.0 |
| 12 | MYA | 18.08 | AA | 28.72 | St | 20.11 | 18.6 |

TABLE 2-2

| Crystalline resin | Alcohol component Unit | SP | Carboxylic acid component Unit | SP | SP value of resin SP1 |
|---|---|---|---|---|---|
| 13 | HO | 24.45 | AA | 24.85 | 23.4 |
| | | | DDA | 21.90 | |
| 14 | HO | 24.45 | DDA | 21.90 | 23.2 |
| 15 | DDO | 21.71 | DDA | 21.90 | 21.8 |
| 16 | EG | 30.33 | DDA | 21.90 | 23.7 |
| 17 | EG | 30.33 | AA | 24.85 | 26.5 |

TABLE 3

| Crystalline resin | Mw | $T_p$ [° C.] | AVc [mgKOH/g] |
|---|---|---|---|
| 1 | 34,000 | 62 | 5.0 |
| 2 | 29,000 | 62 | 5.0 |
| 3 | 30,000 | 62 | 5.0 |
| 4 | 36,000 | 62 | 5.0 |
| 5 | 29,000 | 62 | 5.0 |
| 6 | 28,000 | 62 | 5.0 |
| 7 | 40,000 | 62 | 5.0 |
| 8 | 26,000 | 47 | 5.0 |
| 9 | 27,000 | 55 | 5.0 |
| 10 | 45,000 | 42 | 5.0 |
| 11 | 13,200 | 66 | 5.0 |
| 12 | 36,000 | 62 | 5.0 |
| 13 | 22,000 | 68 | 20.0 |
| 14 | 29,000 | 72 | 11.0 |
| 15 | 30,000 | 78 | 15.0 |
| 16 | 26,000 | 72 | 12.0 |
| 17 | 33,000 | 70 | 20.0 |

The abbreviations in Table 1 and Table 2 are as described below.

BEA: behenyl acrylate
STA: stearyl acrylate
MYA: myricyl acrylate
UDA: undecyl acrylate
HA: hexadecyl acrylate
AN: acrylonitrile
AA: acrylic acid
St: styrene
HO: hexanediol
AA: adipic acid
DDA: dodecanedioic acid
DDO: dodecanediol
EG: ethylene glycol <Production Example of Second Resin 1 (Amorphous Resin 1)>

An autoclave was loaded with 50.0 parts of xylene and purged with nitrogen, and then the temperature was increased to 185° C. in a sealed state under stirring.

79.0 Parts of styrene, 17.0 parts of n-butyl acrylate, 3.1 parts of divinylbenzene, and 0.9 part of acrylic acid, and a mixed solution of 1.0 part of di-tert-butyl peroxide and 20.0 parts of xylene were continuously added dropwise thereto for 3 hours to perform polymerization while the temperature in the autoclave was controlled to 185° C.

The same temperature was kept for an additional 1 hour to complete the polymerization, and the solvent was removed to provide a second resin 1 (amorphous resin 1). The second resin 1 (amorphous resin 1) had a weight-average molecular weight (Mw) of 60,000, a softening point (Tm) of 140° C., an acid value of 15.0 mgKOH/g, and a hydroxyl value of 0.0 mgKOH/g.

<Production Examples of Second Resins 2 to 10 (Amorphous Resins 2 to 10)>

Second resins 2 to 10 (amorphous resins 2 to 10) were obtained by performing reactions in the same manner as in the production example of the second resin 1 (amorphous resin 1) except that the respective monomers and the numbers of parts by mass thereof were changed as shown in Table 4. Their physical properties are shown in Table 5.

<Production Example of Second Resin 11 (Amorphous Resin 11)>

Under a nitrogen atmosphere, the following materials were loaded into a reaction vessel with a reflux condenser, a stirrer, a temperature gauge, and a nitrogen-introducing tube.

Polyoxypropylene(2.2)-2,2-bis(4-hydroxyphenyl)propane: 73.4 parts (0.19 mol; 100.0 mol % with respect to the total number of moles of the polyhydric alcohol)

Terephthalic acid: 11.6 parts (0.07 mol; 82.0 mol % with respect to the total number of moles of the polyvalent carboxylic acids)

Adipic acid: 6.8 parts (0.05 mol; 14.0 mol % with respect to the total number of moles of the polyvalent carboxylic acids)

Titanium tetrabutoxide: 2.0 parts

Next, the flask was purged with a nitrogen gas. After that, the temperature was gradually increased while the mixture was stirred. The mixture was subjected to a reaction for 2 hours while being stirred at a temperature of 200° C. and while produced water was distilled out.

Further, a pressure in the reaction vessel was reduced to 8.3 kPa and maintained at the pressure for 1 hour. After that, the temperature was cooled to 180° C. and the pressure was returned to atmospheric pressure (first reaction step).

Trimellitic anhydride: 8.2 parts (0.04 mol; 6.0 mol % with respect to the total number of moles of the polyvalent carboxylic acids)

tert-Butylcatechol (polymerization inhibitor): 0.1 part

After that, the above-mentioned materials were added. The pressure in the reaction vessel was decreased to 8.3 kPa, and a reaction was performed for 4 hours while the temperature was maintained at 150° C., followed by a decrease in temperature to stop the reaction (second reaction step). Thus, a second resin 11 was obtained. Its monomers and the numbers of parts by mass thereof are shown in Table 4, and its physical properties are shown in Table 5.

<Production Example of Second Resin 12>

Under a nitrogen atmosphere, the following materials were loaded into a reaction vessel with a reflux condenser, a stirrer, a temperature gauge, and a nitrogen-introducing tube.

Polyoxyethylene(2.2)-2,2-bis(4-hydroxyphenyl)propane: 70.0 parts (0.17 mol; 100.0 mol % with respect to the total number of moles of the polyhydric alcohol)

Terephthalic acid: 8.0 parts (0.05 mol; 28.0 mol % with respect to the total number of moles of the polyvalent carboxylic acids)

Adipic acid: 8.0 parts (0.06 mol; 32.0 mol % with respect to the total number of moles of the polyvalent carboxylic acids)

Titanium tetrabutoxide: 2.5 parts

The above-mentioned materials were weighed and loaded into a reaction vessel with a condenser, a stirrer, a nitrogen-introducing tube, and a thermocouple. Next, the flask was purged with a nitrogen gas. After that, the temperature was gradually increased while the mixture was stirred. The mixture was subjected to a reaction for 2 hours while being stirred at a temperature of 230° C. and while produced water was distilled out. Next, a reaction was performed under a reduced pressure of 2.5 kPa for 5 hours, and then the temperature was decreased to 180° C. 1 Part of tert-butylcatechol was added as a polymerization inhibitor, and 8 parts (0.01 mol; 40.0 mol % with respect to the total number of moles of the polyvalent carboxylic acids) of fumaric acid was further added. The mixture was subjected to a reaction under a reduced pressure of from 0.5 kPa to 2.5 kPa for 8 hours, and then the resultant was taken out to provide a second resin 12. Its monomers and the numbers of parts by mass thereof are shown in Table 4, and its physical properties are shown in Table 5.

TABLE 4

| Amorphous | Polymerizable monomer 1 | | Polymerizable monomer 2 | | Polymerizable monomer 3 | | Polymerizable monomer 4 | |
|---|---|---|---|---|---|---|---|---|
| resin | Kind | Parts | Kind | Parts | Kind | Parts | Kind | Parts |
| 1 | St | 75.0 | BA | 21.0 | DVB | 3.0 | AA | 1.0 |
| 2 | St | 70.0 | BA | 26.0 | DVB | 3.0 | AA | 1.0 |
| 3 | St | 45.0 | MMA | 51.0 | DVB | 3.0 | AA | 1.0 |
| 4 | St | 86.0 | BA<br>OCA | 8.0<br>2.0 | DVB | 3.0 | AA | 1.0 |
| 5 | St | 30.0 | BA<br>MMA | 10.0<br>56.0 | DVB | 3.0 | AA | 1.0 |
| 6 | St | 92.0 | BA<br>OCA | 3.0<br>1.0 | DVB | 3.0 | AA | 1.0 |
| 7 | St | 30.0 | BA<br>MMA | 2.0<br>62.0 | DVB | 5.0 | AA | 1.0 |
| 8 | St | 80.0 | BA | 20.0 | — | — | — | — |
| 9 | St | 30.0 | MMA | 64.0 | DVB | 5.0 | AA | 1.0 |
| 10 | St | 35.0 | MMA | 64.0 | ADA | 1.0 | — | — |
| 11 | BPO-PO | 73.4 | TPA | 11.6 | ADA | 6.8 | TMA | 8.2 |
| 12 | BPO-EO | 65.0 | TPA | 13.0 | ADA | 12.0 | FA | 10.0 |

The abbreviations in Table 4 are as described below.
St: styrene
MMA: methyl methacrylate
BA: n-butyl acrylate
OA: n-octyl acrylate
DVB: divinylbenzene
DDA: dodecyl acrylate
AA: acrylic acid
BPO-PO: polyoxypropylene(2.2)-2,2-bis(4-hydroxyphenyl)propane
BPO-EO: polyoxyethylene(2.2)-2,2-bis(4-hydroxyphenyl)propane
TPA: terephthalic acid
TMA: trimellitic acid
ADA: adipic acid

TABLE 5

| Amorphous resin | Mw | Tg [° C.] | Tm [° C.] | AVa [mgKOH/g] | SP value of resin SP2 |
|---|---|---|---|---|---|
| 1 | 60,000 | 58 | 120 | 16.0 | 20.2 |
| 2 | 65,000 | 48 | 120 | 20.0 | 20.2 |
| 3 | 70,000 | 58 | 110 | 24.0 | 20.3 |
| 4 | 50,000 | 58 | 125 | 18.0 | 20.2 |
| 5 | 55,000 | 52 | 100 | 20.0 | 20.3 |
| 6 | 62,000 | 65 | 105 | 12.0 | 20.2 |
| 7 | 35,000 | 58 | 120 | 25.0 | 20.3 |
| 8 | 20,000 | 65 | 85 | 0.0 | 20.1 |
| 9 | 40,000 | 65 | 120 | 20.0 | 20.3 |
| 10 | 35,000 | 52 | 90 | 25.0 | 20.3 |
| 11 | 71,000 | 54 | 105 | 21.0 | 23.3 |
| 12 | 6,000 | 54 | 70 | 25.0 | 24.0 |

<Production Example of Block Copolymer 1>

(Production Example of Polymer for Amorphous Resin Block)

Under a nitrogen atmosphere, the following materials were loaded into a reaction vessel with a reflux condenser, a stirrer, a temperature gauge, and a nitrogen-introducing tube.

Polyoxyethylene(2.2)-2,2-bis(4-hydroxyphenyl)propane: 36.0 parts (0.09 mol; 50.0 mol % with respect to the total number of moles of the polyhydric alcohols)

Polyoxypropylene(2.2)-2,2-bis(4-hydroxyphenyl)propane: 33.8 parts (0.09 mol; 50.0 mol % with respect to the total number of moles of the polyhydric alcohols)

Terephthalic acid: 16.0 parts (0.10 mol; 55.4 mol % with respect to the total number of moles of the polyvalent carboxylic acids)

n-Dodecenylsuccinic acid: 9.9 parts (0.01 mol; 21.4 mol % with respect to the total number of moles of the polyvalent carboxylic acids)

Adipic acid: 4.3 parts (0.01 mol; 21.2 mol % with respect to the total number of moles of the polyvalent carboxylic acids)

Dibutyltin oxide: 1.0 part

A nitrogen gas was introduced into the vessel to keep an inert atmosphere, and the temperature was increased, followed by a condensation polymerization reaction at 150° C. for 12 hours. After that, the pressure was gradually reduced at 210° C. Thus, a polymer for an amorphous resin block was synthesized. The weight-average molecular weight of the resultant polymer was measured to be 41,000. The glass transition temperature Tg thereof was 50° C., the softening point Tm thereof was 100° C., and the acid value thereof was 10 mgKOH/g.

(Production Example of Polymer for Crystalline Resin Block)

| | |
|---|---|
| Solvent: toluene | 100.0 parts |
| Stearyl acrylate | 100.0 parts |
| Polymerization initiator [t-Butyl peroxypivalate (manufactured by NOF Corporation: PERBUTYL PV)] | 0.5 part |
| Chain transfer agent 2-Cyano-2-propyl dodecyl trithiocarbonate | 3.0 parts |

Under a nitrogen atmosphere, the above-mentioned materials were loaded into a reaction vessel with a reflux condenser, a stirrer, a temperature gauge, and a nitrogen-introducing tube. While being stirred at 200 rpm, the contents of the reaction vessel were heated to 70° C. and subjected to a polymerization reaction for 12 hours to provide a dissolved liquid in which a polymer of the monomer composition was dissolved in toluene. Subsequently, the temperature of the dissolved liquid was decreased to 25° C., and then the dissolved liquid was charged into 1,000.0 parts of methanol under stirring to precipitate methanol-insoluble matter. The resultant methanol-insoluble matter was separated by filtration, further washed with methanol, and then dried to provide a polymer for a crystalline resin block. The weight-average molecular weight of the resultant polymer was measured to be 50,000. The melting point thereof was 63° C.

<Synthesis of Block Copolymer>

Under a nitrogen atmosphere, the following materials were loaded into a reaction vessel with a reflux condenser, a stirrer, a temperature gauge, and a nitrogen-introducing tube.

| | |
|---|---|
| Polymer for amorphous resin block | 27 parts |
| Polymer for a crystalline resin block | 73 parts |
| Toluene | 150 parts |

Under a nitrogen atmosphere, the materials were stirred and dissolved, and then 2.7 parts of dicyclohexylcarbodiimide (DCC) and 0.17 part of dimethylaminopyridine (DMAP) were added, and the mixture was subjected to a reaction at 50° C. for 2 hours. The dissolved liquid was charged into 1,000.0 parts of methanol under stirring to precipitate methanol-insoluble matter. The resultant methanol-insoluble matter was separated by filtration, further washed with methanol, and then dried to provide a block copolymer 1.

<Production Example of Hybrid Resin 1>

60.0 Parts of the first resin 7 and 40.0 parts of the second resin 12 were mixed, and the mixture was fed at 40 kg/h to a twin-screw kneader (manufactured by Kurimoto, Ltd., S5KRC kneader), and at the same time, 4.0 parts of t-butyl peroxyisopropylmonocarbonate was fed as a radical reaction initiator at 0.4 kg/h, and a reaction was performed by kneading and extruding the mixture at 100 rpm at 160° C. for 5 minutes. Further, mixing was performed while nitrogen was allowed to flow from the vent hole to remove an organic solvent. The product obtained by the mixing was cooled to provide a hybrid resin 1.

<Production Example of Toner Particles 1>

<Production Example of First Resin 1 Fine Particle Dispersion Liquid>

| | |
|---|---|
| Toluene (manufactured by Wako Pure Chemical Industries, Ltd.) | 300 parts |
| First resin 1 | 100 parts |

The above-mentioned materials were weighed and mixed, and dissolved at 90° C.

Separately, 5.0 parts of sodium dodecylbenzenesulfonate and 10.0 parts of sodium laurate were added to 700 parts of ion-exchanged water and dissolved therein by heating at 90° C. Then, the above-mentioned toluene solution and the aqueous solution were mixed with each other, and the mixture was stirred at 7,000 rpm using an ultrahigh-speed stirring apparatus T.K. Robomix (manufactured by Primix Corporation). Further, the mixture was emulsified at a pressure of 200 MPa using a high-pressure impact-type dispersing machine Nanomizer (manufactured by Yoshida Kikai Co., Ltd.). After that, toluene was removed using an evaporator, and concentration adjustment was performed with ion-exchanged water to provide an aqueous dispersion liquid of first resin 1 fine particles having a concentration of 20 mass % (first resin 1 fine particle dispersion liquid).

The 50% particle diameter (D50) of the first resin 1 fine particles on a volume basis was measured using a dynamic light scattering-type particle size distribution meter Nanotrac UPA-EX150 (manufactured by Nikkiso Co., Ltd.), and was found to be 0.40 m.

<Production Example of Second Resin 1 Fine Particle Dispersion Liquid>

| | |
|---|---|
| Tetrahydrofuran (manufactured by Wako Pure Chemical Industries, Ltd.) | 300 parts |
| Second resin 1 | 100 parts |
| Anionic surfactant Neogen RK (manufactured by DKS Co., Ltd.) | 0.5 part |

The above-mentioned materials were weighed and mixed, and dissolved.

Then, 20.0 parts of 1 mol/L ammonia water was added, and the whole was stirred with an ultrahigh-speed stirring apparatus T.K. Robomix (manufactured by Primix Corporation) at 4,000 rpm. Further, 700 parts of ion-exchanged water was added at a rate of 8 g/min to precipitate second resin 1 fine particles. After that, tetrahydrofuran was removed using an evaporator, and concentration adjustment was performed with ion-exchanged water to provide an aqueous dispersion liquid of the second resin 1 fine particles having a concentration of 20 mass % (second resin 1 fine particle dispersion liquid).

The 50% particle diameter (D50) of the second resin 1 fine particles on a volume basis was 0.14 m.

<Production Example of Wax Fine Particle Dispersion Liquid>

| | |
|---|---|
| Hydrocarbon wax 1 (Fischer-Tropsch wax; DSC: peak temperature at maximum endothermic peak: 92° C.) | 100 parts |
| Anionic surfactant Neogen RK (manufactured by DKS Co., Ltd.) | 5 parts |
| Ion-exchanged water | 395 parts |

The above-mentioned materials were weighed and loaded into a mixing vessel with a stirring apparatus, and then heated to 90° C. and subjected to dispersion treatment for 60 minutes by being circulated in Clearmix W-Motion (manufactured by M Technique Co., Ltd.). The conditions of the dispersion treatment were set as described below.

Rotor outer diameter: 3 cm

Clearance: 0.3 mm

Number of rotor rotations: 19,000 r/min

Number of screen rotations: 19,000 r/min

After the dispersion treatment, the resultant was cooled to 40° C. under the cooling treatment conditions of a number of rotor rotations of 1,000 r/min, a number of screen rotations of 0 r/min, and a cooling rate of 10° C./min to provide an aqueous dispersion liquid of wax (hydrocarbon compound) fine particles having a concentration of 20 mass % (wax fine particle dispersion liquid).

The 50% particle diameter (D50) of the wax (hydrocarbon compound) fine particles on a volume basis was measured using a dynamic light scattering-type particle size distribution meter Nanotrac UPA-EX150 (manufactured by Nikkiso Co., Ltd.), and was found to be 0.15 μm.

<Production Example of Colorant Fine Particle Dispersion Liquid>

| | |
|---|---|
| Colorant 1 (Cyan pigment: manufactured by Dainichiseika Color & Chemicals Mfg. Co., Ltd.: Pigment Blue 15:3) | 50.0 parts |
| Anionic surfactant Neogen RK (manufactured by DKS Co., Ltd.) | 7.5 parts |
| Ion-exchanged water | 442.5 parts |

The above-mentioned materials were weighed and mixed, dissolved, and dispersed for about 1 hour using a high-pressure impact-type dispersing machine Nanomizer (manufactured by Yoshida Kikai Co., Ltd.) to provide an aqueous dispersion liquid of colorant fine particles having a concentration of 10 mass % in which the colorant was dispersed (colorant fine particle dispersion liquid).

The 50% particle diameter (D50) of the colorant fine particles on a volume basis was measured using a dynamic light scattering-type particle size distribution meter Nanotrac UPA-EX150 (manufactured by Nikkiso Co., Ltd.), and was found to be 0.20

| | |
|---|---|
| First resin 1 fine particle dispersion liquid | 300 parts |
| Second resin 1 fine particle dispersion liquid | 200 parts |

-continued

| | |
|---|---|
| Colorant fine particle dispersion liquid | 65 parts |
| Wax fine particle dispersion liquid | 50 parts |
| Ion-exchanged water | 160 parts |

The above-mentioned materials were loaded into a round flask made of stainless steel, and were mixed. Subsequently, the mixture was dispersed using a homogenizer ULTRA-TURRAX T50 (manufactured by IKA) at 5,000 r/min for 10 minutes. A 1.0% aqueous solution of nitric acid was added to adjust the pH to 3.0, and then the mixture was heated to 58° C. in a water bath for heating while the number of rotations was appropriately adjusted so as to stir the mixed liquid with a stirring blade. Formed aggregated particles were appropriately checked using Coulter Multisizer III, and at the time when aggregated particles having a weight-average particle diameter (D4) of about 6.00 m were formed, the pH was adjusted to 9.0 with a 5% aqueous solution of sodium hydroxide.

After that, while stirring was continued, heating was performed to 75° C. Then, the temperature was held at 75° C. for 1 hour to fuse the aggregated particles.

After that, the resultant was cooled to 50° C. and held for 3 hours to promote the crystallization of the resin.

After that, the resultant was cooled to 25° C., and subjected to filtration and solid-liquid separation, followed by washing with ion-exchanged water.

After the completion of the washing, the resultant was dried using a vacuum dryer to provide toner particles 1 having a weight-average particle diameter (D4) of about 6.0 μm.

<Production Example of Toner Particles 2>

| | |
|---|---|
| First resin 1 | 60 parts |
| Second resin 1 | 40 parts |
| Hydrocarbon wax 1 | 10.0 parts |
| Colorant 1 | 6.5 parts |

The above-mentioned materials were mixed with a Henschel mixer (Model FM-75, manufactured by Nippon Coke & Engineering Co., Ltd.) at a number of rotations of 20 $s^{-1}$ for a time of rotation 3 min, and thereafter, the mixture was kneaded with a twin-screw kneading machine set to a temperature of 120° C. (Model PCM-30, manufactured by Ikegai Corp.) at a number of screw rotations of 250 rpm and a discharge temperature of 125° C. The kneaded product thus obtained was cooled and coarsely pulverized with a hammer mill to 1 mm or less to provide a coarsely pulverized product. The coarsely pulverized product thus obtained was finely pulverized with a mechanical pulverizer (T-250 manufactured by Freund-Turbo Corporation).

Further, the finely pulverized product was classified with Faculty F-300 (manufactured by Hosokawa Micron Corporation) to provide toner particles 1 having a weight-average particle diameter of about 6.0 μm. The operating conditions were as follows: the number of rotations of a classification rotor was set to 130 $s^{-1}$ and the number of rotations of a dispersion rotor was set to 120 $s^{-1}$.

<Production Examples of Toner Particles 3 to 40>

Toner particles 3 to 40 were obtained by performing production in the same manner as in the production example of the toner particles 1 except that the resins and wax used, and their addition amounts were changed as shown in Table 6.

A hydrocarbon wax 2 is a petroleum wax having a melting point of 78° C.

TABLE 6

| | | Crystalline resin | | Amorphous resin | | Wax | |
|---|---|---|---|---|---|---|---|
| Toner particles | Production method | Kind | Number of parts | Kind | Number of parts | Kind | Number of parts |
| 1 | Emulsion aggregation method | 1 | 50 | 1 | 50 | Hydrocarbon wax 1 | 10 |
| 2 | Melt-kneading method | 1 | 50 | 1 | 50 | Hydrocarbon wax 1 | 10 |
| 3 | Melt-kneading method | 1 | 50 | 2 | 50 | Hydrocarbon wax 1 | 10 |
| 4 | Melt-kneading method | 1 | 50 | 1 | 50 | Hydrocarbon wax 1 | 10 |
| 5 | Melt-kneading method | 1 | 50 | 1 | 50 | Hydrocarbon wax 1 | 10 |
| 6 | Melt-kneading method | 1 | 50 | 2 | 50 | Hydrocarbon wax 1 | 10 |
| 7 | Melt-kneading method | 1 | 50 | 1 | 50 | Hydrocarbon wax 2 | 10 |
| 8 | Melt-kneading method | 1 | 20 | 1 | 80 | Hydrocarbon wax 1 | 10 |
| 9 | Melt-kneading method | 1 | 35 | 1 | 65 | Hydrocarbon wax 1 | 10 |
| 10 | Melt-kneading method | 1 | 65 | 1 | 35 | Hydrocarbon wax 1 | 10 |
| 11 | Melt-kneading method | 1 | 80 | 1 | 20 | Hydrocarbon wax 1 | 10 |
| 12 | Melt-kneading method | 1 | 60 | 1 | 40 | Hydrocarbon wax 1 | 10 |
| 13 | Melt-kneading method | 1 | 60 | 3 | 40 | Hydrocarbon wax 1 | 10 |
| 14 | Melt-kneading method | 1 | 60 | 4 | 40 | Hydrocarbon wax 1 | 10 |
| 15 | Melt-kneading method | 2 | 60 | 1 | 40 | Hydrocarbon wax 1 | 10 |
| 16 | Melt-kneading method | 2 | 60 | 5 | 40 | Hydrocarbon wax 1 | 10 |
| 17 | Melt-kneading method | 2 | 60 | 6 | 40 | Hydrocarbon wax 1 | 10 |
| 18 | Melt-kneading method | 3 | 60 | 5 | 40 | Hydrocarbon wax 1 | 10 |
| 19 | Melt-kneading method | 4 | 60 | 5 | 40 | Hydrocarbon wax 1 | 10 |
| 20 | Melt-kneading method | 5 | 60 | 5 | 40 | Hydrocarbon wax 1 | 10 |
| 21 | Melt-kneading method | 6 | 60 | 5 | 40 | Hydrocarbon wax 1 | 10 |
| 22 | Melt-kneading method | 7 | 60 | 5 | 40 | Hydrocarbon wax 1 | 10 |
| 23 | Melt-kneading method | 7 | 60 | 11 | 40 | Hydrocarbon wax 1 | 10 |
| 24 | Melt-kneading method | 13 | 60 | 11 | 40 | Hydrocarbon wax 1 | 10 |
| 25 | Melt-kneading method | 8 | 60 | 11 | 40 | Hydrocarbon wax 1 | 10 |
| 26 | Melt-kneading method | 9 | 60 | 11 | 40 | Hydrocarbon wax 1 | 10 |
| 27 | Melt-kneading method | 14 | 60 | 11 | 40 | Hydrocarbon wax 1 | 10 |
| 28 | Melt-kneading method | 14 | 60 | 11 | 40 | Hydrocarbon wax 1 | 10 |
| 29 | Melt-kneading method | 14 | 60 | 11 | 40 | Hydrocarbon wax 1 | 10 |
| 30 | Melt-kneading method | 15 | 60 | 11 | 40 | Hydrocarbon wax 1 | 10 |
| 31 | Melt-kneading method | 16 | 60 | 11 | 40 | Hydrocarbon wax 1 | 10 |
| 32 | Melt-kneading method | 14 | 20 | 11 | 80 | Hydrocarbon wax 1 | 10 |
| 33 | Melt-kneading method | 17 | 60 | 11 | 40 | Hydrocarbon wax 1 | 10 |
| 34 | Melt-kneading method | 10 | 60 | 7 | 40 | Hydrocarbon wax 1 | 10 |
| 35 | Melt-kneading method | 100 parts of block copolymer 1 | | | | Hydrocarbon wax 1 | 10 |
| 36 | Melt-kneading method | 100 parts of hybrid resin 1 | | | | Hydrocarbon wax 1 | 10 |
| 37 | Melt-kneading method | 11 | 60 | 8 | 40 | Hydrocarbon wax 1 | 10 |
| 38 | Melt-kneading method | 9 | 60 | 9 | 40 | Hydrocarbon wax 1 | 10 |
| 39 | Melt-kneading method | 12 | 60 | 7 | 40 | Hydrocarbon wax 2 | 10 |
| 40 | Melt-kneading method | 7 | 60 | 10 | 40 | Hydrocarbon wax 1 | 10 |

Example 1 (Production Example of Toner 1)

| | |
|---|---|
| Toner particles 1 | 100 parts |
| Silica fine particles 1 (hydrophobized silica fine particles having a number-average particle diameter of primary particles of 15 nm) | 0.5 part |
| Silica fine particles 2 (hydrophobized silica fine particles having a number-average particle diameter of primary particles of 80 nm) | 1.0 part |

The above-mentioned materials were mixed with a Henschel mixer Model FM-10C (manufactured by Mitsui Miike Chemical Engineering Machinery, Co., Ltd.) at a number of rotations of 50 $s^{-1}$ for a time of rotation of 10 min to provide a toner 1. Its physical properties are shown in Table 7.

In addition, in the toner particles, the ratio of the crystalline resin 1 in the matrix was 86%, and the ratio of the amorphous resin 1 in the domains was 86%.

Examples 2 to 31 (Production Examples of Toners 2 to 31) and Comparative Examples 1 to 9 (Toners 32 to 40)

Toners 2 to 40 were obtained by performing production in the same manner as in the production example of the toner 1 except that the toner particles were changed as shown in Table 7. The physical properties of the resultant toners 2 to 40 are shown in Table 7.

In each of the toner particles, the ratio of the crystalline resin in the matrix was from 82% to 94%, and the ratio of the amorphous resin in the domains was from 82% to 94 mass %. In the toner 33, no sea-island structure was observed, and hence it was impossible to calculate the ratio of the crystalline resin in the matrix and the ratio of the amorphous resin in the domains.

In the toner 35, although a single resin was used, a sea-island structure that was conceivably based on micro-phase separation was observed.

TABLE 7-1

| | Toner | Toner particles | Content ratio W2/W1 | Weight-average particle diameter Weight-average particle diameter [μm] | Cross-sectional structure Sea portion | Island portion | Number-average diameter of domains [μm] |
|---|---|---|---|---|---|---|---|
| Example 1 | 1 | 1 | 1.0 | 6.0 | Crystalline resin | Amorphous resin | 1.2 |
| Example 2 | 2 | 2 | 1.0 | 6.0 | Crystalline resin | Amorphous resin | 0.3 |
| Example 3 | 3 | 3 | 1.0 | 6.0 | Crystalline resin | Amorphous resin | 0.5 |
| Example 4 | 4 | 4 | 1.0 | 6.0 | Crystalline resin | Amorphous resin | 0.6 |
| Example 5 | 5 | 5 | 1.0 | 6.0 | Crystalline resin | Amorphous resin | 0.5 |
| Example 6 | 6 | 6 | 1.0 | 6.0 | Crystalline resin | Amorphous resin | 0.3 |
| Example 7 | 7 | 7 | 1.0 | 6.0 | Crystalline resin | Amorphous resin | 0.7 |
| Example 8 | 8 | 8 | 4.0 | 6.0 | Crystalline resin | Amorphous resin | 0.5 |
| Example 9 | 9 | 9 | 1.9 | 6.0 | Crystalline resin | Amorphous resin | 0.9 |
| Example 10 | 10 | 10 | 0.5 | 6.0 | Crystalline resin | Amorphous resin | 0.6 |
| Example 11 | 11 | 11 | 0.3 | 6.0 | Crystalline resin | Amorphous resin | 0.7 |
| Example 12 | 12 | 12 | 0.7 | 6.0 | Crystalline resin | Amorphous resin | 0.4 |
| Example 13 | 13 | 13 | 0.7 | 6.0 | Crystalline resin | Amorphous resin | 0.4 |
| Example 14 | 14 | 14 | 0.7 | 6.0 | Crystalline resin | Amorphous resin | 0.5 |
| Example 15 | 15 | 15 | 0.7 | 6.0 | Crystalline resin | Amorphous resin | 0.3 |
| Example 16 | 16 | 16 | 0.7 | 6.0 | Crystalline resin | Amorphous resin | 0.6 |
| Example 17 | 17 | 17 | 0.7 | 6.0 | Crystalline resin | Amorphous resin | 0.7 |
| Example 18 | 18 | 18 | 0.7 | 6.0 | Crystalline resin | Amorphous resin | 0.6 |
| Example 19 | 19 | 19 | 0.7 | 6.0 | Crystalline resin | Amorphous resin | 0.6 |
| Example 20 | 20 | 20 | 0.7 | 6.0 | Crystalline resin | Amorphous resin | 0.5 |
| Example 21 | 21 | 21 | 0.7 | 6.0 | Crystalline resin | Amorphous resin | 0.6 |
| Example 22 | 22 | 22 | 0.7 | 6.0 | Crystalline resin | Amorphous resin | 0.8 |
| Example 23 | 23 | 23 | 0.7 | 6.0 | Crystalline resin | Amorphous resin | 2.1 |
| Example 24 | 24 | 24 | 0.7 | 6.0 | Crystalline resin | Amorphous resin | 2.2 |
| Example 25 | 25 | 25 | 0.7 | 6.0 | Crystalline resin | Amorphous resin | 2.3 |
| Example 26 | 26 | 26 | 0.7 | 6.0 | Crystalline resin | Amorphous resin | 2.1 |
| Example 27 | 27 | 27 | 0.7 | 6.0 | Crystalline resin | Amorphous resin | 2.1 |
| Example 28 | 28 | 28 | 0.7 | 6.0 | Crystalline resin | Amorphous resin | 2.1 |
| Example 29 | 29 | 29 | 0.7 | 6.0 | Crystalline resin | Amorphous resin | 2.3 |
| Example 30 | 30 | 30 | 0.7 | 6.0 | Crystalline resin | Amorphous resin | 2.4 |
| Example 31 | 31 | 31 | 0.7 | 6.0 | Crystalline resin | Amorphous resin | 2.5 |
| Comparative Example 1 | 32 | 32 | 4.0 | 6.0 | Amorphous resin | Crystalline resin | 1.0 |
| Comparative Example 2 | 33 | 33 | 0.7 | 6.0 | No sea-island structure found | | — |
| Comparative Example 3 | 34 | 34 | 0.7 | 6.0 | Crystalline resin | Amorphous resin | 0.8 |
| Comparative Example 4 | 35 | 35 | 0.7 | 6.0 | Crystalline portion | Amorphous portion | 0.6 |
| Comparative Example 5 | 36 | 36 | 0.7 | 6.0 | Crystalline resin | Amorphous resin | 0.6 |
| Comparative Example 6 | 37 | 37 | 0.7 | 6.0 | Crystalline resin | Amorphous resin | 0.7 |
| Comparative Example 7 | 38 | 38 | 0.7 | 6.0 | Crystalline resin | Amorphous resin | 1.3 |
| Comparative Example 8 | 39 | 39 | 0.7 | 6.0 | Crystalline resin | Amorphous resin | 1.6 |
| Comparative Example 9 | 40 | 40 | 0.7 | 6.0 | Crystalline resin | Amorphous resin | 1.4 |

TABLE 7-2

| | Toner | Toner particles | DSC Endothermic quantity ΔH [J/g] derived from first resin | Temperature Tp [° C.] at endothermic peak derived from first resin | Flow tester T10 [° C.] | T1-T10 [° C.] | Resin polarity SP2-SP1 |
|---|---|---|---|---|---|---|---|
| Example 1 | 1 | 1 | 10 | 62 | 70 | 6 | 0.1 |
| Example 2 | 2 | 2 | 10 | 62 | 70 | 6 | 0.1 |

TABLE 7-2-continued

| | | | DSC | | Flow tester | | Resin |
|---|---|---|---|---|---|---|---|
| | Toner | Toner particles | Endothermic quantity ΔH [J/g] derived from first resin | Temperature Tp [° C.] at endothermic peak derived from first resin | T10 [° C.] | T1-T10 [° C.] | polarity SP2-SP1 |
| Example 3 | 3 | 3 | 10 | 62 | 70 | 6 | 0.1 |
| Example 4 | 4 | 4 | 10 | 62 | 70 | 6 | 0.1 |
| Example 5 | 5 | 5 | 10 | 62 | 70 | 6 | 0.1 |
| Example 6 | 6 | 6 | 10 | 62 | 70 | 6 | 0.1 |
| Example 7 | 7 | 7 | 10 | 62 | 70 | 6 | 0.1 |
| Example 8 | 8 | 8 | 10 | 62 | 70 | 6 | 0.1 |
| Example 9 | 9 | 9 | 10 | 62 | 70 | 6 | 0.1 |
| Example 10 | 10 | 10 | 10 | 62 | 70 | 6 | 0.1 |
| Example 11 | 11 | 11 | 10 | 62 | 70 | 6 | 0.1 |
| Example 12 | 12 | 12 | 10 | 62 | 70 | 6 | 0.1 |
| Example 13 | 13 | 13 | 10 | 62 | 70 | 6 | 0.2 |
| Example 14 | 14 | 14 | 10 | 62 | 70 | 6 | 0.1 |
| Example 15 | 15 | 15 | 10 | 62 | 70 | 6 | 0.4 |
| Example 16 | 16 | 16 | 10 | 62 | 70 | 6 | 0.5 |
| Example 17 | 17 | 17 | 10 | 62 | 70 | 6 | 0.4 |
| Example 18 | 18 | 18 | 10 | 62 | 70 | 6 | 0.0 |
| Example 19 | 19 | 19 | 10 | 62 | 70 | 6 | 0.3 |
| Example 20 | 20 | 20 | 10 | 62 | 70 | 6 | 0.9 |
| Example 21 | 21 | 21 | 10 | 62 | 70 | 6 | −0.3 |
| Example 22 | 22 | 22 | 10 | 62 | 70 | 6 | 1.0 |
| Example 23 | 23 | 23 | 10 | 62 | 70 | 6 | 4.0 |
| Example 24 | 24 | 24 | 10 | 68 | 70 | 9 | −0.1 |
| Example 25 | 25 | 25 | 10 | 47 | 70 | 3 | 3.9 |
| Example 26 | 26 | 26 | 10 | 55 | 70 | 5 | 4.0 |
| Example 27 | 27 | 27 | 10 | 72 | 70 | 6 | 0.1 |
| Example 28 | 28 | 28 | 10 | 72 | 66 | 6 | 0.1 |
| Example 29 | 29 | 29 | 10 | 72 | 74 | 6 | 0.1 |
| Example 30 | 30 | 30 | 15 | 78 | 81 | 6 | 1.5 |
| Example 31 | 31 | 31 | 4 | 72 | 70 | 6 | −0.4 |
| Comparative Example 1 | 32 | 32 | 4 | 72 | 75 | 5 | 0.1 |
| Comparative Example 2 | 33 | 33 | 1 | 72 | 72 | 3 | −3.2 |
| Comparative Example 3 | 34 | 34 | 3 | 42 | 62 | 8 | −0.2 |
| Comparative Example 4 | 35 | 35 | 10 | 47 | 57 | 40 | — |
| Comparative Example 5 | 36 | 36 | 15 | 62 | 68 | 25 | — |
| Comparative Example 6 | 37 | 37 | 12 | 62 | 75 | 16 | 1.1 |
| Comparative Example 7 | 38 | 38 | 10 | 55 | 72 | 20 | 1.0 |
| Comparative Example 8 | 39 | 39 | 10 | 80 | 72 | 25 | 1.7 |
| Comparative Example 9 | 40 | 40 | 10 | 62 | 72 | 28 | 1.0 |

<Production Example of Magnetic Carrier 1>

Magnetite 1 having a number-average particle diameter of 0.30 μm (magnetization intensity under a magnetic field of 1,000/47c (kA/m) of 65 $Am^2/kg$)

Magnetite 2 having a number-average particle diameter of 0.50 μm (magnetization intensity under a magnetic field of 1,000/47c (kA/m) of 65 $Am^2/kg$)

To 100 parts each of the above-mentioned materials, 4.0 parts of a silane compound (3-(2-aminoethylaminopropyl) trimethoxysilane) was added, and the mixture was subjected to high-speed mixing and stirring at 100° C. or more in a vessel to treat fine particles of each material.

Phenol: 10 mass %

Formaldehyde solution: 6 mass % (formaldehyde: 40 mass %, methanol: 10 mass %, water: 50 mass %)

Magnetite 1 treated with the above-mentioned silane compound: 58 mass %

Magnetite 2 treated with the above-mentioned silane compound: 26 mass %

100 Parts of the above-mentioned materials, 5 parts of a 28 mass % aqueous ammonia solution, and 20 parts of water were placed in a flask. While the contents were stirred and mixed, the temperature was increased to 85° C. in 30 minutes and held to perform a polymerization reaction for 3 hours to cure a produced phenol resin.

After that, the cured phenol resin was cooled to 30° C., and water was added. After that, the supernatant was removed, and the precipitate was washed with water and then air-dried.

Then, the air-dried product was dried under reduced pressure (5 mmHg or less) at a temperature of 60° C. to provide a spherical magnetic carrier 1 of a magnetic material dispersion type. The 50% particle diameter (D50) of the magnetic carrier 1 on a volume basis was 34.2 μm.

<Production Example of Two-Component Developer 1>

8.0 Parts of the toner 1 was added to 92.0 parts of the magnetic carrier 1, and the contents were mixed with a V-type mixer (V-20 manufactured by Seishin Enterprise Co., Ltd.) to provide a two-component developer 1.

<Production Examples of Two-Component Developers 2 to 40>

Two-component developers 2 to 40 were obtained by performing production in the same manner as in the production example of the two-component developer 1 except that the toner was changed as shown in Table 8.

TABLE 8

| | Two-component developer | Toner particles | Carrier |
|---|---|---|---|
| Example 1 | Two-component developer 1 | Toner 1 | Carrier 1 |
| Example 2 | Two-component developer 2 | Toner 2 | Carrier 1 |
| Example 3 | Two-component developer 3 | Toner 3 | Carrier 1 |
| Example 4 | Two-component developer 4 | Toner 4 | Carrier 1 |
| Example 5 | Two-component developer 5 | Toner 5 | Carrier 1 |
| Example 6 | Two-component developer 6 | Toner 6 | Carrier 1 |
| Example 7 | Two-component developer 7 | Toner 7 | Carrier 1 |
| Example 8 | Two-component developer 8 | Toner 8 | Carrier 1 |
| Example 9 | Two-component developer 9 | Toner 9 | Carrier 1 |
| Example 10 | Two-component developer 10 | Toner 10 | Carrier 1 |
| Example 11 | Two-component developer 11 | Toner 11 | Carrier 1 |
| Example 12 | Two-component developer 12 | Toner 12 | Carrier 1 |
| Example 13 | Two-component developer 13 | Toner 13 | Carrier 1 |
| Example 14 | Two-component developer 14 | Toner 14 | Carrier 1 |
| Example 15 | Two-component developer 15 | Toner 15 | Carrier 1 |
| Example 16 | Two-component developer 16 | Toner 16 | Carrier 1 |
| Example 17 | Two-component developer 17 | Toner 17 | Carrier 1 |
| Example 18 | Two-component developer 18 | Toner 18 | Carrier 1 |
| Example 19 | Two-component developer 19 | Toner 19 | Carrier 1 |
| Example 20 | Two-component developer 20 | Toner 20 | Carrier 1 |
| Example 21 | Two-component developer 21 | Toner 21 | Carrier 1 |
| Example 22 | Two-component developer 22 | Toner 22 | Carrier 1 |
| Example 23 | Two-component developer 23 | Toner 23 | Carrier 1 |
| Example 24 | Two-component developer 24 | Toner 24 | Carrier 1 |
| Example 25 | Two-component developer 25 | Toner 25 | Carrier 1 |
| Example 26 | Two-component developer 26 | Toner 26 | Carrier 1 |
| Example 27 | Two-component developer 27 | Toner 27 | Carrier 1 |
| Example 28 | Two-component developer 28 | Toner 28 | Carrier 1 |
| Example 29 | Two-component developer 29 | Toner 29 | Carrier 1 |
| Example 30 | Two-component developer 30 | Toner 30 | Carrier 1 |
| Example 31 | Two-component developer 31 | Toner 31 | Carrier 1 |
| Comparative Example 1 | Two-component developer 32 | Toner 32 | Carrier 1 |
| Comparative Example 2 | Two-component developer 33 | Toner 33 | Carrier 1 |
| Comparative Example 3 | Two-component developer 34 | Toner 34 | Carrier 1 |
| Comparative Example 4 | Two-component developer 35 | Toner 35 | Carrier 1 |
| Comparative Example 5 | Two-component developer 36 | Toner 36 | Carrier 1 |
| Comparative Example 6 | Two-component developer 37 | Toner 37 | Carrier 1 |
| Comparative Example 7 | Two-component developer 38 | Toner 38 | Carrier 1 |
| Comparative Example 8 | Two-component developer 39 | Toner 39 | Carrier 1 |
| Comparative Example 9 | Two-component developer 40 | Toner 40 | Carrier 1 |

Evaluations were performed using each of the two-component developers 1 to 40.

A reconstructed machine of a printer for digital commercial printing "imagePRESS C810" manufactured by Canon Inc. was used as an image-forming apparatus, and a two-component developer was loaded into its developing unit for a cyan color. As the reconstructed points of the apparatus, changes were made so that its fixation temperature and process speed, the DC voltage VDC of a developer bearing member, the charging voltage VD of an electrostatic latent image-bearing member, and the laser power could be freely set.

In particular, in order to establish that excellent performance can be exhibited in high-speed printing as compared to the related art, evaluation was performed at an increased process speed. In addition, image output evaluation was performed as follows: an FFh image (solid image) having a desired image print percentage was output and subjected to evaluations to be described later with the VDC, the VD, and the laser power being adjusted so as to achieve a desired toner laid-on level on the FFh image on paper. FFh is a value obtained by representing 256 gradations in hexadecimal notation; 00 h represents the first gradation (white portion) of the 256 gradations, and FFh represents the 256th gradation (solid portion) of the 256 gradations.

The evaluations were performed based on the following evaluation methods, and the results are shown in Table 9.

[Low-Temperature Fixability]

Paper: GFC-081 (81.0 g/m$^2$)

(sold from Canon Marketing Japan Inc.)

Toner laid-on level on paper: 0.80 mg/cm$^2$ (adjusted based on the DC voltage VDC of the developer bearing member, the charging voltage VD of the electrostatic latent image-bearing member, and the laser power)

Evaluation image: An image measuring 2 cm×5 cm was arranged at the center of the above-mentioned A4 paper Test environment: Low-temperature and low-humidity environment: temperature of 15° C./humidity of 10% RH (hereinafter referred to as "L/L")

Fixation temperature: 140° C.

Process speed: 400 mm/sec

The evaluation image was output, and low-temperature fixability was evaluated. The value of an image density reduction ratio was used as an evaluation index for the low-temperature fixability.

For the image density reduction ratio, through use of an X-Rite color reflection densitometer (500 SERIES: manufactured by X-Rite, Inc.), the image density at the central portion of the image is measured first. Next, the fixed image is rubbed (back and forth 5 times) with lens-cleaning paper with the application of a load of 4.9 kPa (50 g/cm$^2$) to the portion at which the image density has been measured, and the image density is measured again.

Then, an image density reduction ratio between before and after the rubbing was calculated using the following equation. The resultant image density reduction ratio was evaluated in accordance with the following evaluation criteria.

Image density reduction ratio=(image density before rubbing-image density after rubbing)/(image density before rubbing)×100

(Evaluation Criteria)

AA: An image density reduction ratio of less than 1.0%

A: An image density reduction ratio of 1.0% or more and less than 3.0%

B: An image density reduction ratio of 3.0% or more and less than 5.0%

C: An image density reduction ratio of 5.0% or more and less than 8.0%

D: An image density reduction ratio of 8.0% or more

[Hot Offset Resistance]

Paper: CS-064 (64.0 g/m$^2$)

(sold from Canon Marketing Japan Inc.)

Toner laid-on level on paper: 0.08 mg/cm$^2$ (adjusted based on the DC voltage VDC of the developer bearing member, the charging voltage VD of the electrostatic latent image-bearing member, and the laser power)

Evaluation image: An image measuring 2 cm×20 cm was arranged at the long edge in the paper passing direction of the above-mentioned A4 paper in such a way as to leave a margin of 2 mm from the edge of the paper Test environment: Normal-temperature and low-humidity environment: temperature of 23° C./humidity of 5% RH (hereinafter referred to as "N/L")

Fixation temperature: Temperature increase from 140° C. in increments of 5° C.

Process speed: 400 mm/sec

The evaluation image was output, and hot offset resistance was evaluated by the following criteria based on the highest fixation temperature at which hot offset did not occur.

(Evaluation Criteria)

A: 165° C. or more

B: 155° C. or more and less than 165° C.

C: 145° C. or more and less than 155° C.

D: Less than 145° C.

[Winding Resistance]

Paper: CS-064 (64.0 g/m$^2$)

(sold from Canon Marketing Japan Inc.)

Toner laid-on level on paper: 0.80 mg/cm$^2$ (adjusted based on the DC voltage VDC of the developer bearing member, the charging voltage VD of the electrostatic latent image-bearing member, and the laser power)

Evaluation image: An image measuring 2 cm×20 cm was arranged at the long edge in the paper passing direction of the above-mentioned A4 paper in such a way as to leave a margin of 2 mm from the edge of the paper Test environment: High-temperature and high-humidity environment: temperature of 30° C./humidity of 80% RH (hereinafter referred to as "H/H")

Fixation temperature: Temperature increase from 140° C. in increments of 5° C.

Process speed: 400 mm/sec

The evaluation image was output, and winding resistance was evaluated by the following criteria based on the highest fixation temperature at which winding did not occur.

(Evaluation Criteria)

A: 165° C. or more

B: 155° C. or more and less than 165° C.

C: 145° C. or more and less than 155° C.

D: Less than 145° C.

[Evaluation of Image after Endurance]

Adjustments were made so that the laid-on level of the toner in an FFh image (solid image) on the paper became 0.45 mg/cm$^2$. FFh is a value obtained by representing 256 gradations in hexadecimal notation; 00 h represents the first gradation (white portion) of the 256 gradations, and FF represents the 256th gradation (solid portion) of the 256 gradations.

First, under a normal-temperature and normal-humidity environment (N/N; temperature: 23° C., relative humidity: 50%), a 5,000-sheet image output test was performed at an image print percentage of 2%. With the image print percentage being as low as 2%, the intention was to apply a stress to the toner in the developing unit. During 5,000-sheet continuous paper passing, paper passing was performed under the same developing conditions and transfer conditions (without calibration) as those of the first sheet.

After that, a 3,000-sheet image output test was performed at an image print percentage of 80%. By setting the image print percentage to as high as 80%, the intention was to increase the opportunities for contact between a drum or a cleaning member and the toner. During 3,000-sheet continuous paper passing, paper passing was performed under the same developing conditions and transfer conditions (without calibration) as those for the first sheet. GFC-081 (81.0 g/m$^2$) (sold from Canon Marketing Japan Inc.) was used as evaluation paper.

After that, a solid image was output on one sheet and evaluated in accordance with the following evaluation criteria. Rank C or higher was judged as showing the effect of the present disclosure. In addition, the evaluation results are shown in Table 9.

(Evaluation Criteria)

AA: No image defect that is visible to the naked eye is found.

A: Slight blank dots/streaks that are visible to the naked eye are found in part of the image.

B: Slight blank dots/streaks that are visible to the naked eye are found all over the image.

C: Blank dots/streaks that are visible to the naked eye are found in part of the image.

D: Blank dots/streaks that are visible to the naked eye are found all over the image.

[Chargeability Under High-Temperature and High-Humidity Environment (Charging Maintaining Property)]

A toner on the electrostatic latent image-bearing member was collected by suction using a metal cylindrical tube and a cylindrical filter, and thereby the triboelectrification amount of the toner was calculated.

Specifically, the triboelectrification amount of the toner on the electrostatic latent image-bearing member was measured with a Faraday cage. The "Faraday cage" refers to a coaxial double cylinder, and its inner cylinder and outer cylinder are insulated from each other. When a charged body having a charge amount Q is placed in the inner cylinder, a substantial equivalent of the presence of a metal cylinder having the charge amount Q is created through electrostatic induction. The induced charge amount was measured with an electrometer (Keithley 6517A manufactured by Keithley Instruments, Inc.), and the quotient (Q/M) obtained by dividing the charge amount Q (mC) by the mass M (kg) of the toner in the inner cylinder was defined as the triboelectrification amount of the toner.

$$\text{Triboelectrification amount of toner (mC/kg)}=Q/M$$

First, the evaluation image used for the winding resistance was formed on the electrostatic latent image-bearing member, and before its transfer onto an intermediate transfer member, the rotation of the electrostatic latent image-bearing member was stopped, and the toner on the electrostatic latent image-bearing member was collected by suction with a metal cylindrical tube and a cylindrical filter, and measured for its [initial Q/M].

Subsequently, in a high-temperature and high-humidity (H/H) environment (32° C., 80% RH), the evaluation machine including the developing unit was left to stand for 2 weeks, and then the same operation as that before the standing was performed to measure a charge amount Q/M (mC/kg) per unit mass on the electrostatic latent image-bearing member after the standing. The Q/M per unit mass on the electrostatic latent image-bearing member before the standing described above was represented by [initial Q/M], the Q/M per unit mass on the electrostatic latent image-bearing member after the standing was represented by [Q/M after standing], and ([Q/M after standing]/[initial Q/M]×100) was calculated as a maintenance ratio, followed by judgment by the following criteria.

(Evaluation Criteria)

A: A maintenance ratio of 90% or more

B: A maintenance ratio of 85% or more and less than 90%

C: A maintenance ratio of 70% or more and less than 85%

D: A maintenance ratio of less than 70%

TABLE 9

| | Developer | Low-temperature fixability % | Low-temperature fixability Rank | Hot offset resistance ° C. | Hot offset resistance Rank | Winding resistance ° C. | Winding resistance Rank | HH charging maintenance ratio % | HH charging maintenance ratio Rank | Image after endurance Rank |
|---|---|---|---|---|---|---|---|---|---|---|
| Example 1 | Two-component developer 1 | 0.9 | AA | 165 | A | 170 | A | 91 | A | AA |
| Example 2 | Two-component developer 2 | 0.8 | AA | 165 | A | 170 | A | 95 | A | AA |
| Example 3 | Two-component developer 3 | 0.7 | AA | 165 | A | 170 | A | 95 | A | AA |
| Example 4 | Two-component developer 4 | 0.8 | AA | 165 | A | 170 | A | 94 | A | AA |
| Example 5 | Two-component developer 5 | 0.8 | AA | 165 | A | 170 | A | 96 | A | AA |
| Example 6 | Two-component developer 6 | 0.7 | AA | 165 | A | 170 | A | 95 | A | AA |
| Example 7 | Two-component developer 7 | 0.7 | AA | 170 | A | 170 | A | 95 | A | AA |
| Example 8 | Two-component developer 8 | 1.4 | A | 165 | A | 170 | A | 94 | A | AA |
| Example 9 | Two-component developer 9 | 0.8 | AA | 165 | A | 170 | A | 95 | A | AA |
| Example 10 | Two-component developer 10 | 0.8 | AA | 165 | A | 170 | A | 92 | A | AA |
| Example 11 | Two-component developer 11 | 0.8 | AA | 160 | B | 160 | B | 93 | A | AA |
| Example 12 | Two-component developer 12 | 0.8 | AA | 165 | A | 165 | A | 94 | A | AA |
| Example 13 | Two-component developer 13 | 0.8 | AA | 165 | A | 165 | A | 92 | A | AA |
| Example 14 | Two-component developer 14 | 0.8 | AA | 165 | A | 165 | A | 95 | A | AA |
| Example 15 | Two-component developer 15 | 0.8 | AA | 165 | A | 155 | B | 92 | A | AA |
| Example 16 | Two-component developer 16 | 0.8 | AA | 165 | A | 155 | B | 87 | B | A |
| Example 17 | Two-component developer 17 | 7.0 | C | 165 | A | 155 | B | 92 | A | A |
| Example 18 | Two-component developer 18 | 0.8 | AA | 165 | A | 155 | B | 87 | B | A |
| Example 19 | Two-component developer 19 | 0.8 | AA | 165 | A | 155 | B | 85 | B | A |
| Example 20 | Two-component developer 20 | 0.8 | AA | 165 | A | 155 | B | 86 | B | A |
| Example 21 | Two-component developer 21 | 7.2 | C | 165 | A | 155 | B | 87 | B | A |
| Example 22 | Two-component developer 22 | 0.8 | AA | 155 | B | 155 | B | 86 | B | A |
| Example 23 | Two-component developer 23 | 1.2 | A | 155 | B | 150 | C | 77 | C | B |
| Example 24 | Two-component developer 24 | 4.4 | B | 155 | B | 150 | C | 78 | C | C |
| Example 25 | Two-component developer 25 | 1.3 | A | 155 | B | 150 | C | 78 | C | B |
| Example 26 | Two-component developer 26 | 1.5 | A | 155 | B | 150 | C | 77 | C | B |
| Example 27 | Two-component developer 27 | 4.5 | B | 150 | C | 150 | C | 78 | C | C |
| Example 28 | Two-component developer 28 | 4.6 | B | 150 | C | 150 | C | 79 | C | C |
| Example 29 | Two-component developer 29 | 4.1 | B | 150 | C | 150 | C | 77 | C | C |
| Example 30 | Two-component developer 30 | 3.9 | B | 150 | C | 150 | C | 77 | C | C |
| Example 31 | Two-component developer 31 | 4.7 | B | 150 | C | 150 | C | 78 | C | C |
| Comparative Example 1 | Two-component developer 32 | 11.0 | D | 160 | B | 155 | B | 65 | D | B |
| Comparative Example 2 | Two-component developer 33 | 10.5 | D | 155 | B | 155 | B | 60 | D | B |
| Comparative Example 3 | Two-component developer 34 | 3.8 | B | 155 | B | 155 | B | 87 | B | D |
| Comparative Example 4 | Two-component developer 35 | 3.8 | B | 155 | B | 155 | B | 86 | B | D |
| Comparative Example 5 | Two-component developer 36 | 2.2 | A | 155 | B | 150 | C | 90 | A | D |
| Comparative Example 6 | Two-component developer 37 | 6.8 | C | 150 | C | 150 | C | 76 | C | D |

TABLE 9-continued

| | Developer | Low-temperature fixability | | Hot offset resistance | | Winding resistance | | HH charging maintenance ratio | | Image after endurance |
|---|---|---|---|---|---|---|---|---|---|---|
| | | % | Rank | ° C. | Rank | ° C. | Rank | % | Rank | Rank |
| Comparative Example 7 | Two-component developer 38 | 2.1 | A | 140 | D | 140 | D | 85 | B | D |
| Comparative Example 8 | Two-component developer 39 | 2.5 | A | 140 | D | 140 | D | 85 | B | D |
| Comparative Example 9 | Two-component developer 40 | 2.1 | A | 140 | D | 140 | D | 85 | B | D |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-006915, filed Jan. 20, 2021, and Japanese Patent Application No. 2021-202485, filed Dec. 14, 2021, which are hereby incorporated by reference herein in their entirety.

What is claimed is:

1. A toner comprising:

a toner particle containing a binder resin including a first resin and a second resin, wherein the first resin is a crystalline vinyl resin, wherein the second resin is an amorphous resin which is vinyl-based resin, wherein, in cross-sectional observation of the toner particle, the toner particle has a domain-matrix structure formed of:

a matrix containing the first resin in an amount of 80% by mass or more; and domains each containing the second resin in an amount of 80% by mass or more;

wherein, in differential scanning calorimetry (DSC) of the toner, an endothermic quantity ΔH (J/g) derived from the first resin satisfies a relationship of ΔH≥3, and wherein, in flow tester measurement using the toner as a sample, T1 and T10 satisfy the following relationships:

$$T10 \geq 65;$$

$$T1 - T10 \leq 10$$

where the T1 (° C.) represents a temperature at which a melt viscosity V1 at an applied pressure of 0.9807 MPa becomes $1\times10^5$ Pa·s, and the T10 (° C.) represents a temperature at which a melt viscosity V10 at an applied pressure of 9.807 MPa becomes $1\times10^5$ Pa's, and the first resin has a first monomer unit, a second monomer unit and a third monomer unit, the first monomer unit is represented by formula (1);

(1)

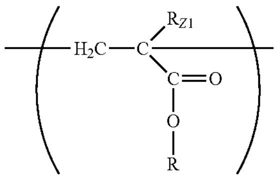

in formula (1), $R_{Z1}$ represents a hydrogen atom or a methyl group, and R represents an alkyl group having 18 to 36 carbon atoms, the second monomer unit is represented by formula (3);

(3)

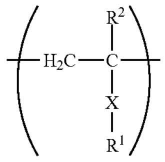

in the formula (3), X represents a single bond, $R^1$ represents —C≡N or —$COOR^{11}$, where $R^{11}$ represents a hydrogen atom, and $R^2$ represents a hydrogen atom or a methyl group, and the third monomer unit is a styrene monomer unit, a methyl methacrylate monomer unit or a methyl acrylate monomer unit.

2. The toner according to claim 1, wherein SP1 and SP2 satisfy the following relationship:

$$SP2 - SP1 \leq 0.9$$

where the SP1 represents an SP value of the first resin, and the SP2 represents an SP value of the second resin.

3. The toner according to claim 1, wherein, in the DSC using the toner as a sample, a temperature Tp (° C.) at a maximum endothermic peak derived from the first resin satisfies a relationship of 45≤Tp≤70.

4. The toner according to claim 1, wherein the first resin contains the first monomer unit in an amount of from 20.0 to 80.0% by mass.

5. The toner according to claim 1, wherein the second resin contains a monomer unit represented by formula (5) in an amount of from 30.0 to 95.0% by mass:

(5)

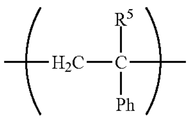

in formula (5), $R^5$ represents a hydrogen atom or a methyl group, and Ph represents an unsubstituted phenyl group or a phenyl group having a substituent.

6. The toner according to claim 1, wherein W1 and W2 satisfy:

$$0.2 \leq W2/W1 \leq 4.0$$

where W1 represents a content of the first resin in the toner particle, and W2 represents a content of the second resin in the toner particle.

7. The toner according to claim 2, wherein the SP1 and the SP2 satisfy the following relationship:

$$0.0 \leq SP2 - SP1 \leq 0.5.$$

* * * * *